United States Patent
Arvayo et al.

(10) Patent No.: US 12,448,233 B2
(45) Date of Patent: Oct. 21, 2025

(54) ROBOTIC STACK MOVER

(71) Applicant: Dexterity, Inc., Redwood City, CA (US)

(72) Inventors: Alberto Leyva Arvayo, Palo Alto, CA (US); Charles Richard Bieler, Los Angeles, CA (US); Matthew Rodolfo Molina, San Francisco, CA (US); Andrew Lovett, Burlingame, CA (US); Robert Holmberg, Mountain View, CA (US); Cuthbert Sun, San Francisco, CA (US)

(73) Assignee: Dexterity, Inc., Redwood City, CA (US)

( * ) Notice: Subject to any disclaimer, the term of this patent is extended or adjusted under 35 U.S.C. 154(b) by 788 days.

(21) Appl. No.: 17/713,077

(22) Filed: Apr. 4, 2022

(65) Prior Publication Data

US 2022/0332509 A1 Oct. 20, 2022

Related U.S. Application Data

(60) Provisional application No. 63/175,792, filed on Apr. 16, 2021.

(51) Int. Cl.
*B65G 61/00* (2006.01)
(52) U.S. Cl.
CPC ...... *B65G 61/00* (2013.01); *B65G 2201/0258* (2013.01)
(58) Field of Classification Search
CPC .......................... B65G 61/00; B65G 2201/0258
See application file for complete search history.

(56) References Cited

U.S. PATENT DOCUMENTS

| | | | | |
|---|---|---|---|---|
| 5,203,666 A | * | 4/1993 | Mojden | B65G 47/5181 |
| | | | | 414/416.07 |
| 6,579,053 B1 | * | 6/2003 | Grams | B65G 47/90 |
| | | | | 414/268 |
| 7,559,737 B2 | * | 7/2009 | Ray | B65G 61/00 |
| | | | | 414/793 |
| 2008/0223690 A1 | * | 9/2008 | Brugger | B65B 35/56 |
| | | | | 198/379 |
| 2014/0138213 A1 | | 5/2014 | Magni | |
| 2016/0244277 A1 | * | 8/2016 | Paulussen | B65G 1/1378 |
| 2018/0222612 A1 | * | 8/2018 | Bacellar | B65B 23/12 |
| 2020/0094997 A1 | * | 3/2020 | Menon | B25J 9/1697 |
| 2020/0095001 A1 | * | 3/2020 | Menon | B25J 9/0093 |

(Continued)

*Primary Examiner* — Kyle O Logan
(74) *Attorney, Agent, or Firm* — Van Pelt, Yi & James LLP

(57) ABSTRACT

The present application discloses a robotic stack mover system, and a method and a computer system for controlling the robotic stack mover system. The robotic stack mover system includes a driving unit comprising a motor, a drive chain, a tensioning unit that enforces tension of the drive chain, and a guide rail traversing a distance between the driving unit and the tensioning unit. The motor is operatively coupled to the drive chain, and the motor is configured to drive the drive chain when the motor is driven. The guide rail comprises or supports the drive chain. The driving chain comprises a set of pusher units. The pusher units are respectively configured to engage one or more vehicles inserted to the system, and to cause one or more vehicles to traverse a path having a same direction as a longitudinal direction of the guide rail when the driving chain is driven.

20 Claims, 20 Drawing Sheets

(56) References Cited

U.S. PATENT DOCUMENTS

2020/0269429 A1   8/2020  Chavez
2020/0407178 A1  12/2020  Battles
2021/0047122 A1   2/2021  Issing

* cited by examiner

ROBOTIC STACK MOVER

CROSS REFERENCE TO OTHER APPLICATIONS

This application claims priority to U.S. Provisional Patent Application No. 63/175,792 entitled ROBOTIC STACK MOVER filed Apr. 16, 2021 which is incorporated herein by reference for all purposes.

BACKGROUND OF THE INVENTION

In certain warehouse and similar operations, a set of tasks sometimes referred to herein as "line kitting" may be performed to assemble stacked trays of items for further distribution, such as delivery to a retail point of sale. Stacks of trays containing the same type of item may be received, and trays may be drawn from different homogeneous stacks each having trays of items of a corresponding type to assemble a mixed stack of trays, e.g., to be sent to a given destination.

For example, a bakery may bake different types of products and may fill stackable trays each with a corresponding homogeneous type of product, such as a particular type of bread or other baked good. Stacks of trays may be provided by the bakery, e.g., to a distribution center. One stack may include trays holding loaves of sliced white bread, another may have trays holding loaves of whole wheat bread, still another tray holding packages of blueberry cupcakes, etc. Trays may be drawn from the various stacks to assemble a (potentially) mixed stack of trays. For example, a stack of six trays of white bread, three trays of whole wheat, and one tray of blueberry cupcakes may be assembled, e.g., for delivery to a retail store.

While the above example involves trays of different types of baked good, in other line kitting operations stackable trays may hold other products.

In a typical approach, trays are handled by human workers. The trays may include handholds to enable a human worker to grasp and move trays, e.g., by placing the workers hand on or in the handhold. Such work by human workers may cause fatigue or injuries, may take a lot of time to complete, and could be error prone.

BRIEF DESCRIPTION OF THE DRAWINGS

Various embodiments of the invention are disclosed in the following detailed description and the accompanying drawings.

DETAILED DESCRIPTION

Figure 1A:
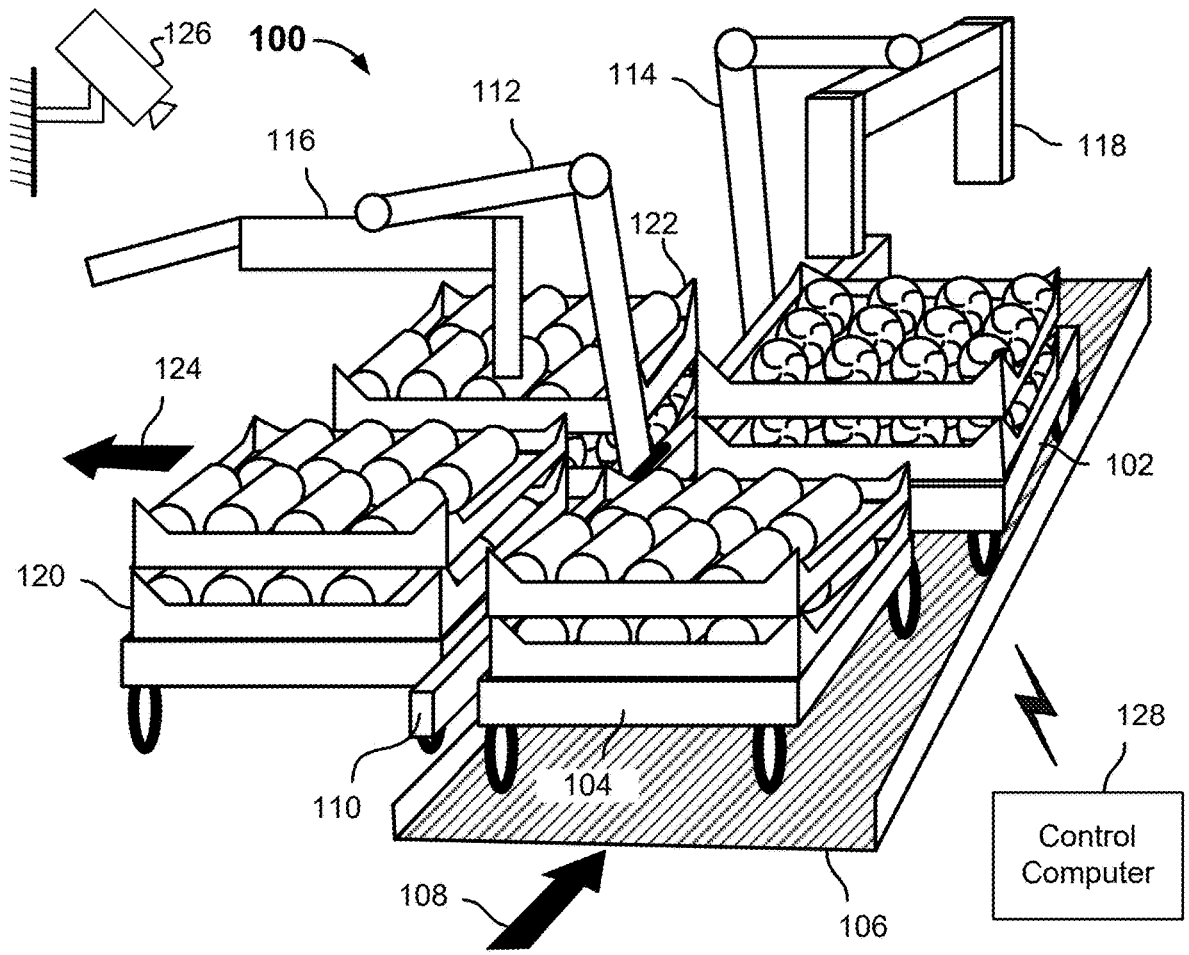
FIG. 1A is a block diagram illustrating a robotic line kitting system according to related art.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a vehicle means a cart, a trolley, a dolly, carriage, wagon, pallets, or other structure configured to hold or support one or more items such as trays (e.g., a stack of trays).

As used herein, a kitting system comprises a robot arm configured to move one or more objects such as in connection with assembling kits and/or packaging kits. In various embodiments, a kitting machine as disclosed herein may comprise one or more kitting shelf machine modules, each comprising a modular component.

Various embodiments include a robotic stack mover system that is configured to receive a plurality of vehicles and to autonomously move at least one vehicle to a destination location within reach of a robot arm. The robot arm is controlled to move (e.g., pick and place) items (e.g., trays comprising a plurality of objects) to/from the vehicle. In various embodiments, the system determines to move the vehicle to the destination location in connection with determining that the items are to be moved to/from the vehicle (e.g., in response to determining to de-stack a stack of items comprised in the vehicle). The system may determine a plan to move the item to the destination location such as to within a range/workspace of a robot arm such as a particular robot arm among a plurality of robot arms comprised in a kitting system. In response to determining to move the vehicle, the system controls to move the vehicle to the destination location (e.g., according to a determined plan). For example, the system actuates a driving unit (e.g., the system drives a motor) to cause the vehicle to move to the destination location. In response to determining that a kitting operation performed with respect to the vehicle is complete (e.g., all items are de-stacked from the vehicle, a stacking of a set of items is complete, etc.), the system controls to move the vehicle to a vehicle return location and/or to move another vehicle to the destination location.

Various embodiments include a robotic stack mover system. The robotic stack mover system includes a driving unit comprising a motor, a drive chain, a tensioning unit that enforces tension of the drive chain, and a guide rail traversing a distance between the driving unit and the tensioning unit. The motor is operatively connected to the drive chain, and the motor is configured to drive the drive chain when the motor is driven. The guide rail comprises or supports the drive chain. The driving chain comprises a set of pusher units. The pusher units are respectively configured to engage one or more vehicles inserted to the system, and to cause one or more vehicles to traverse a path having a same direction as a longitudinal direction of the guide rail when the driving chain is driven. The one or more vehicles may respectively comprise a stack of items such as a stack of trays (e.g., trays that include one or more objects). The system provides a linear movement of stacks using a low-profile drive chain.

Various embodiments include a robotic stack mover system. The robotic stack mover system includes a driving unit comprising a motor, a drive chain, a tensioning unit that enforces tension of the drive chain, and a guide rail traversing a distance between the driving unit and the tensioning unit. The motor is operatively coupled to the drive chain, and the motor is configured to drive the drive chain when the motor is driven. The guide rail comprises a channel configured to guide and support the drive chain. The driving chain comprises a set of pusher units. The pusher units are respectively configured to engage one or more vehicles inserted to the system, and to cause one or more vehicles to traverse a path having a same direction as a longitudinal direction of the guide rail when the driving chain is driven in response to a control signal from a robotic control system configured to operate the robotic stack mover system under robotic control to position said one or more vehicles within reach of a robotic instrumentality to enable the robotic instrumentality to perform a task with respect to the one or more vehicles.

In various embodiments, the driving unit comprises one or more driving sprockets, and the motor is operatively connected to at least one of the one or more driving sprockets. Upon being driven, the motor causes the one or more driving sprockets to rotate and drive the drive chain, and correspondingly move a vehicle inserted to the robotic stack mover system. The driving unit may comprise one or more sensors that are used in connection with calibrating the system. At least one of the one or more sensors may be configured to obtains information pertaining to an alignment of the drive chain, such as a pusher unit mounted to the drive chain. For example, the one or more sensors detect a location or presence of at least one of the set of pusher units.

The system uses one or more sensors to calibrate a positioning of one or more pusher units that are used to move vehicles throughout the system (e.g., along a path in a direction that is the same as a direction of a length of a guide rail). The system calibrates the one or more pusher units in connection with ensuring that the system has knowledge of a location of at least one of the one or more pusher units and/or relative locations of one or more other pusher units. Calibration of the system ensures that the system can determine a location of a pusher unit, and by extension, a location (or relative location) of a vehicle (e.g., a cart, dolly, etc.). Upon calibration, the system is able to keep track of a location of a vehicle, determine a number of vehicles that are engaged by the system (e.g., engaged by a respective pusher unit for control of moving the vehicle), etc. The one or more sensors may be disposed within, or in proximity of, the workspace of a robot arm. For example, all or some of the one or more sensors may be comprised in a vision system of the system such as a vision system that operates to obtain information pertaining to items or components in the workspace of the robot arm, and with which the system controls the robot arm to move items (e.g., to stack/de-stack items with respect to a vehicle). As another example, all or some of the one or more sensors may be comprised in the driving unit. As another example, all or some of the one or more sensors may be comprised in the tensioning unit.

In various embodiments, the tensioning unit comprises one or more tensioning sprockets. At least one tensioning sprocket of the one or more tensioning sprockets is movably mounted in a manner that the at least one tension sprocket changes a tension of the drive chain when the at least one tensioning sprocket is moved. The at least one tensioning sprocket that is movably mounted to the tensioning unit may be moved/adjusted via manual intervention such as by a user, or via control of a computer system of the system. The tensioning unit is configured to adjust/enforce a tension in the drive chain of the system. For example, the system uses the tensioning unit to cause a drive chain tension that satisfies a minimum tension threshold when the system is operating to move vehicles. If the tension with respect to the drive chain is insufficient (e.g., less than the minimum tension threshold), the drive chain may become wobbly and create too much slack to properly engage with a vehicle and/or to move the vehicle. In addition, insufficient tension in the drive chain may lead to the drive chain disengaging with the driving unit or tensioning unit (e.g., the drive chain may fall off a sprocket of the driving unit, etc.).

Various embodiments include a drive chain that is sufficiently long to circulate between a driving unit and a tensioning unit. Various materials or configurations of the drive chain may be implemented. In some embodiments, the drive chain is a double-pitched chain, such as a chain made of a metal (e.g., aluminum, stainless steel, or other alloy, etc.). In some embodiments, the drive chain is a belt, such as a belt made of a thermoplastic or canvas, etc. (e.g., a belt similar to a serpentine belt or timing belt in an automobile, etc.). The drive chain has a set of pusher units mounted thereto. For example, the drive chain comprises a plurality of brackets to which the pusher units are mounted (e.g., each link, or a subset of links, of the drive chain comprise a bracket to which a corresponding pusher unit is mounted).

In some embodiments, the system comprises a control computer. The system uses the control computer to control the driving unit (e.g., to actuate the motor) and to control a movement/location of one or more vehicles inserted to the system. The system may further comprise or be connected to a robot arm, and the system uses the control computer to control the robot arm such as in connection with performing a kitting operation (e.g., stacking/de-stacking items such as trays, etc.). The system may comprise a data structure with which the system maintains/stores (i) a mapping of vehicles to manifests (e.g., a packing list or other information indicating a set of items or objects within items comprised in a vehicle), (ii) a mapping of vehicles to locations or relative locations of locations within the system, (iii) a mapping of vehicles to robot arms (e.g., robot arms assigned to stack/de-stack items to/from the vehicle, etc.), (iv) a mapping of robot arms to workspaces or zones corresponding to a range of the robot arms, etc. The system may monitor/track a location of a vehicle and accordingly update the data structure such as the mapping(s), etc. The system may use the data structure to track specific items (or objects comprised in a particular item/vehicle) within the system such as to track a particular vehicle to which the item is stacked, or a particular vehicle (or associated manifest) from which the item is de-stacked/taken.

In various embodiments, the driving unit and the tensioning unit are built using a same set of support structures. The use of a same set of support structures improves manufacturability of the system because manufacturers of the driving units and tensioning units can take advantage of economies of scale. As an example, the driving unit and the tensioning unit respectively comprise a top plate, and the top plate of the driving unit and the top plate of the tensioning unit are manufactured using a same plan (e.g., the top plate of the driving unit and the top plate of the tensioning unit have the same dimensions, material, construction, etc.). As another example, the driving unit and the tensioning unit respectively comprise a bottom plate, and the bottom plate of the driving unit and the bottom plate of the tensioning unit are manufactured using a same plan (e.g., the bottom plates have the same dimensions, material, construction, etc.). As another example, the driving unit and the tensioning unit respectively comprise a set of one or more side plates, and the set of side plate(s) of the driving unit and the set of side plate(s) of the tensioning unit are manufactured using a same plan (e.g., the sets of side plates have the same dimensions, material, construction, etc.).

FIG. 1A is a block diagram illustrating a robotic line kitting system according to related art. In the example shown, system 100 includes source tray stacks 102 and 104 moving along an input stack conveyance 106 fed in this example from an input end 108 (staging and loading area). Each of the source tray stacks 102 and 104 in this example is shown to be stacked on a wheeled cart or chassis. In various embodiments, the source tray stacks 102 and 104 may be pushed manually onto the conveyance 106, which may be a conveyor belt or other structure configured to advance the source tray stacks 102 and 104 through the workspace defined by conveyance 106. In some embodiments, the chassis or other base structure on which the source trays are stacked may be self-propelled. In some embodiments, source tray stacks 102 and 104 may be advanced through/by conveyance 106 under robotic control. For example, the speed and times at which the source tray stacks 102 and 104 are advanced by/through conveyance 106 may be controlled to facilitate efficient grasping of trays from the source tray stacks 102 and 104.

In the example shown, a single rail (e.g., rail 110) is disposed along one long side of the conveyance 106. In this example, two robots, one comprising robotic arm 112 and another comprising robotic arm 114, are mounted movably, independent of one another, on rail 110. For example, each robotic arm 112, 114 may be mounted on a self-propelled chassis that rides along rail 110. In this example, each robotic arm 112, 114 terminates with a tray handling end effector 116, 118.

The tray handling end effector 116, 118 is operated under robotic control to grasp one or more trays from a source tray stack 102, 104. As shown in FIG. 1A, each end effector 116, 118 includes a lateral member attached to the end of the robotic arm 112, 114. A side member is mounted on each end of the lateral member. As shown, at least one of the side members is opened or closed under robotic control, in various embodiments, to enable a tray to be grasped (by closing the side member) or released (by opening the side member).

Each end effector 116, 118 includes one non-moving ("passive") side member and one movable ("active") side member. In this example, the movable or "active" side member swings open (position in which end effector 116 is shown), e.g., to enable the end effector to be placed in position to grasp one or more trays, and swings closed (position in which end effector 118 is shown), e.g., to complete a grasp of one or more trays. A robotic control system (e.g., a computer that controls robotic arm 112, 114, such as control computer 128) controls the end effector to actuate the opening/closing of the end effector such as in connection with grasping or releasing a tray. The robotic control system controls the end effector based at least in part on image data of the workspace and/or one or more sensors comprised in (or connected to) the corresponding end effector. In some embodiments, the one or more sensors comprised in (or connected to) the corresponding end effector are configured to: (i) obtain information indicative of whether a gasping mechanism (e.g., an active member) of the end effector is in an open position or a closed position, (ii) obtain information indicative of an extent to which the grasping mechanism is open, (iii) obtain information indicative of when the tray (or end effector relative to the tray) is in a position at which the end effector is controlled to engage at least one side of the end effector (e.g., a passive member or a structure comprised on the passive member) with a hole, a recess, or a handle comprised in a side of a tray (e.g., a tray being grasped), (iv) obtain information indicative of when the tray (or end effector relative to the tray) is in a position at which the end effector (e.g., a passive member or a structure comprised on the passive member) is engaged with the hole, the recess, or the handle comprised in a side of a tray, and/or (v) obtain information indicative of whether the grasping mechanism is closed or otherwise engaged with the tray.

Each end effector 116, 118 includes on each side member one or more protrusions or similar structures of a size and shape such that the protrusion, etc., fits into and, in various embodiments, can be slid under robotic control into holes or other openings in the sides of the tray(s) to be grasped. For example, in some embodiments, protrusions on the inner face of the side members, sometimes called "thumbs" herein, may be slotted into handholds (e.g., holes sized to accommodate a human hand) on opposite sides of a tray, as described and illustrated more fully below.

The respective robotic arms 112, 114 are operated at the same time, fully autonomously, to pick trays from source tray stacks 102, 104 and place them on destination tray stacks, such as destination tray stacks 120, 122, in a destination tray stack assembly area on an opposite side of rail 110 from conveyance 106 and source tray stacks 102, 104. The destination tray stacks may be assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective source tray stacks 102, 104 and stacking them on a corresponding destination tray stacks 120, 122. Completed destination tray stacks 120, 122 may be removed from the destination tray stack assembly area, as indicated by arrow 124, e.g., to be place on trucks, rail cars, containers, etc. for delivery to a further destination, such as a retail store.

Referring further to FIG. 1A, in the example shown in the system 100 includes a control computer 128 configured to communicate wirelessly with robotic elements comprising system 100, including in various embodiments one or more of conveyance 106; the wheeled chassis on which source tray stacks 102, 104 are stacked (if self-propelled); the robotic arms 112, 114 and/or the respective chassis on which the robotic arms 112, 114 are mounted on rail 110; and the robotically controlled tray handling end effectors 116, 118. In various embodiments, the robotic elements are controlled by control computer 128 based on input data, such as an invoice, an order, and/or manifest information, as well as input state information, such as inventory data indicating which source tray stacks include which type and/or quantity of product.

Source tray stacks 102, 104 may be inserted into a gate or other ingress/control structure at the input end 108 of conveyance 106. Conveyance 106 may comprise an apparatus (stack mover) that moves the source tray stacks 102, 104 along the rail 110 to optimize throughput and minimize robot displacement, e.g., by minimizing how far and/or often the robotic arms 112, 114 must be moved along rail 110 to grasp source trays and place them on respective destination stacks. The source tray stacks 102, 104 can come in with trays in different orientations/weights/and weight distribu-tion. The system 100 uses force and moment control to operate robotic arms 112, 114 to insert a thumb or other protrusion gently and securely into a tray and plans its motion and tray trajectory in order to not collide with itself or the environment. In various embodiments, each robotic arm 112, 114 operates in a very tight space of roughly 2.5 m in width and has a very light footprint. The robot utilizes its full workspace and intelligently plans its motion optimizing its grasp and/or efficiency (e.g., time, collision avoidance, etc.) in de-stacking the source tray stacks 102, 104. It recognizes the need to perform orientation changes and handles that accordingly while avoiding obstacles. The robot moves to the correct output (destination tray stacks 120, 122) corresponding to the right customer while coordinating with the other robots on the rail 110. It then uses advanced force control and interactions with the environment to figure out a proper place strategy. The cycle then restarts.

In the example shown in FIG. 1A, the system 100 includes a 3D camera 126. In various embodiments, the system 100 may include a plurality of 3D (or other) cameras, such as camera 126, and may use image and depth data generated by such cameras to generate a three-dimensional view of at least relevant portions of the workspace and scene, such as the scene/state shown in FIG. 1A. In some embodiments, cameras such as camera 126 may be used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by cameras such as camera 126 is used to move robotic arms and end effectors into a position near a tray or stack of two or more trays to be grasped and picked up from a source stack and/or to position the tray(s) near a destination at which they are to be place, e.g., at the top of a corresponding destination stack. In some embodiments, force control is used, as described more fully below, to complete the final phases of a pick/grasp episode and/or a placement episode.

Although a single camera (e.g., camera 126) mounted to a wall in the workspace of system 100 is shown in FIG. 1A, in various embodiments, multiple cameras or other sensors, or a combination thereof, may be mounted statically in a workspace. In addition, or instead, one or more cameras or other sensors may be mounted on or near each robotic arm 112, 114, such as on the arm itself and/or on the end effector 116, 118, and/or on a structure that travels with the robotic arm 112, 114 as it is moved along rail 110.

Figure 1B:
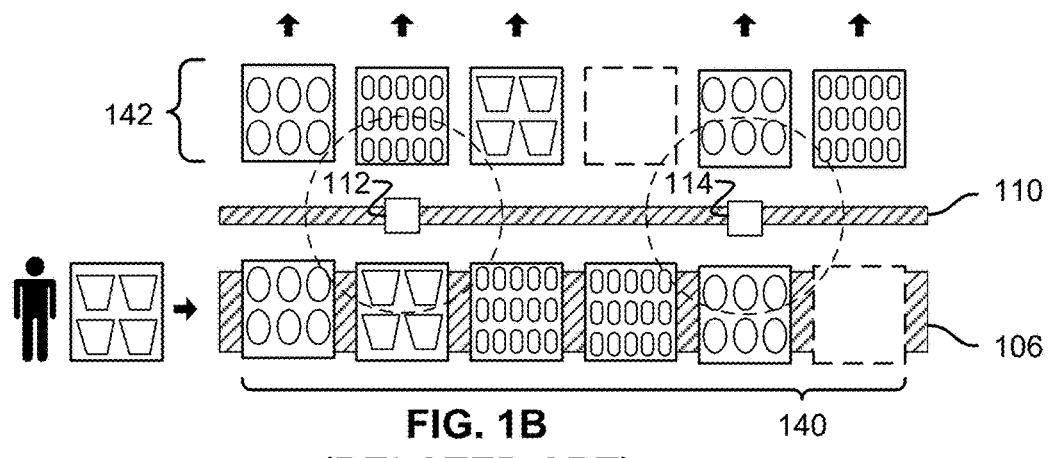
FIG. 1B is a block diagram illustrating a robotic line kitting system according to related art.

FIG. 1B is a block diagram illustrating a robotic line kitting system according to related art. In FIG. 1B, an example is shown of an overhead view of a workspace in which the system 100 of FIG. 1A may operate. In the example shown, robotic arms 112, 114 move along a common rail (e.g., rail 110), as in FIG. 1A, to access and pick trays from source stacks 140 moving along conveyance 106 and place trays on corresponding destination stacks 142 in the destination stack assembly area on the opposite side of rail 110 from the source stacks 140 and conveyance 106. In this example, a human worker manually feeds source stacks onto the conveyance 106, but in some embodiments a robotic worker performs all or part of that task, e.g., according to plan generated programmatically to fulfill a set of orders, each associated with a corresponding destination. As destinations stacks 142 are completed, they are moved out of the destination stack assembly area, as indicated by the arrows the top of FIG. 1B, which corresponds to arrow 124 of FIG. 1A.

While in the example shown in FIGS. 1A and 1B the trays each contain only one type of item (e.g., object), in various embodiments and applications source and destination trays having mixes of items may be handled to assemble destination stacks of trays as disclosed herein. Similarly, while in the example shown in FIGS. 1A and 1B the source stacks of trays each contain only trays of the same type and content, in other embodiments and applications source tray stacks may include a mix of trays and/or item types. For example, the control computer 128 may be provided with information indicating which types of tray are in which position in each source tray stack, and may use that information, along with manifest or other information indicating the required contents of each destination tray stack, to build the required destination tray stacks by picking needed trays each from a corresponding position on a source tray stack and adding the tray to a corresponding destination stack.

Figure 2A:
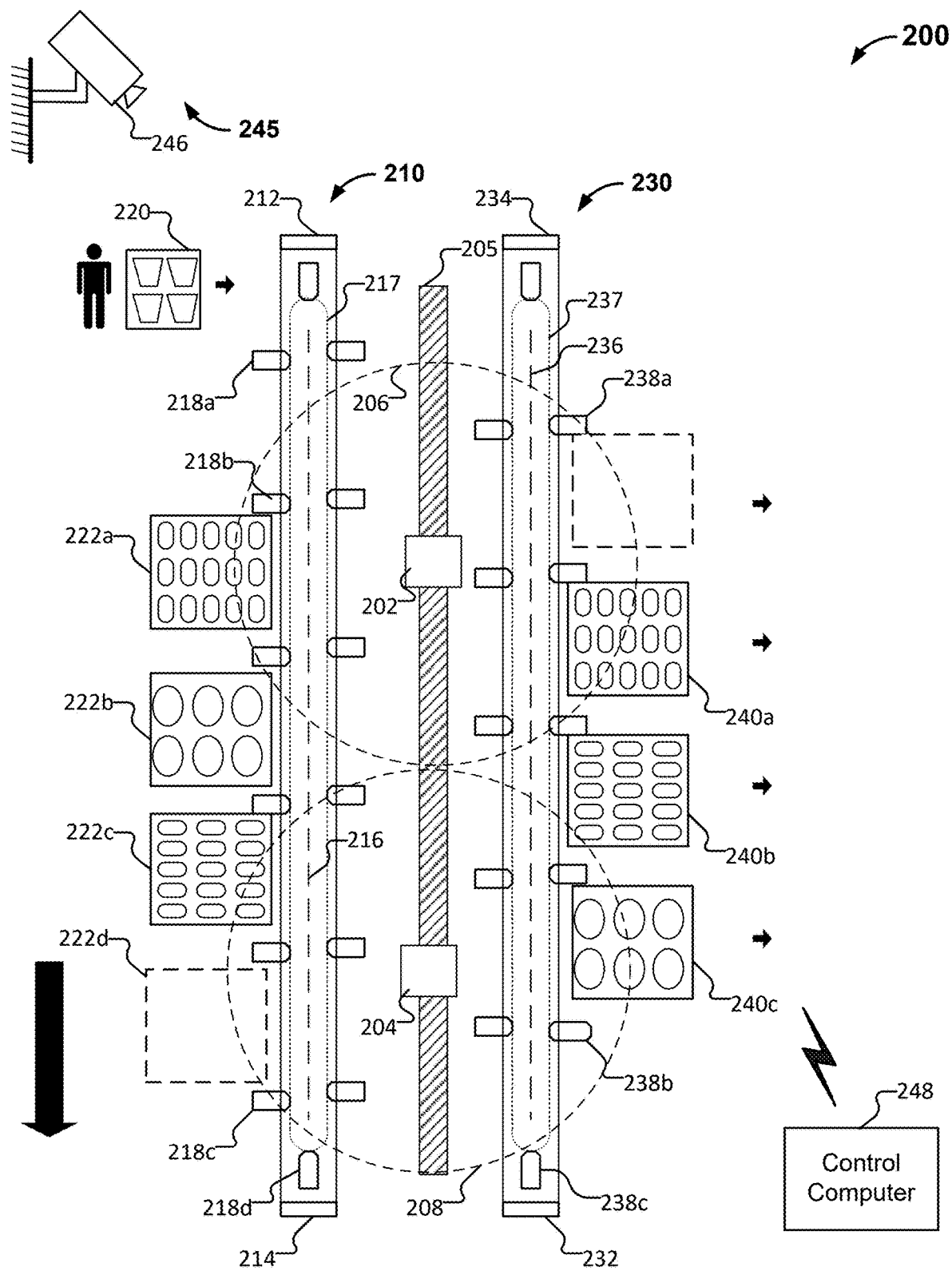
FIG. 2A is a block diagram illustrating an embodiment of a robotic line kitting system.

FIG. 2A is a block diagram illustrating an embodiment of a robotic line kitting system. In the example shown, system 200 includes a robotic stack mover system 210. System 200 uses robotic stack mover system 210 to move (e.g., along a path) tray stacks 222a, 222b, and 222c (e.g., or vehicles in which stacks of trays are comprised or are to be loaded) in position for robot arms 202 and 204 to perform kitting operations such as de-stacking tray stacks 222a, 222b, and 222c, or stacking trays or placing items on trays of stacks of trays. In some embodiments, system 200 controls robotic stack mover system 210 to move tray stacks 222a, 222b, and 222c to respective locations within, or in proximity to, workspaces of robot arms 202 and 204 (e.g., which may correspond to ranges 206 and 208). Robotic stack mover system 210 autonomously moves stacks of trays (or other vehicles) that are inserted to robotic stack mover system 210 (e.g., a predefined insertion location, between pusher units, etc.).

In various embodiments, robotic stack mover system 210 includes a driving unit 212 configured to move tray stacks 222a, 222b, and 222c such as by driving a mechanism to apply respective forces on tray stacks 222a, 222b, and 222c. As an example, the driving unit 212 comprises a motor that is driven based at least in part on a determination to move the tray stacks 222a, 222b, and 222c. System 200 may control the motor via computer control such as by control computer 248 operatively connected to robotic stack mover system 210. In various embodiments, driving unit 212 further includes one or more driving sprockets that are actuated in response to the motor being driven. For example, the motor is connected to at least one of the one or more driving sprockets, and in response to the motor being driven forces are translated from the motor to the one or more driving sprockets. Examples of driving unit 212 include driving unit 500 of FIG. 5A, driving unit 525 of FIG. 5B, and/or driving unit 530 of FIGS. 5C and 5D. Alternatively, or in addition, driving unit 212 may comprise a crank pulley or other mechanism to drive movement of a drive chain, belt, etc.

In various embodiments, robotic stack mover system 210 includes a tensioning unit 214. Tensioning unit 214 may be part of the drive system of robotic stack mover system 210 and ensures the drive system has sufficient tension. In addition, tensioning unit 214 may serve as a recirculation point for the drive system (e.g., a drive chain is redirected and recirculated back to driving unit 212). In some embodiments, tensioning unit 214 comprises one or more tensioning sprockets. At least one tensioning sprocket of the one or more tensioning sprockets is movably mounted in a manner that the at least one tension sprocket changes a tension of the drive chain when the at least one tensioning sprocket is moved. The at least one tensioning sprocket that is movably mounted to tensioning unit 214 may be moved/adjusted via manual intervention such as by a user, or via control of a computer system of the system. The tensioning unit is configured to adjust/enforce a tension in the drive chain of the system.

In various embodiments, robotic stack mover system 210 includes drive chain 217. Drive chain 217 traverses the distance between driving unit 212 and tensioning unit 214. Drive chain 217 receives force from driving unit 212 to cause drive chain 217 to move (e.g., to circulate within robotic stack mover system 210). In some embodiments, drive chain 217 is a double-pitch chain having a profile that comprises a hole or recess in which a tooth of a driving sprocket fits for the driving unit to engage drive chain 217. In some embodiments, drive chain 217 is a belt made such as a thermoplastic belt. Robotic stack mover system 210 may further include guide rail 216 that is configured to provide support for drive chain 217 to ensure that drive chain 217 traverses a longitudinal direction between driving unit 212 and tensioning unit 214. The longitudinal direction of guide rail 216 may be parallel to (or similar to) the direction of rail 205 along which robot arms 202 and 204 (e.g., and on which robot arms 202 and 204 are mounted such as via robot carriages) traverse to pick and place items (e.g., trays, objects from trays, carts, etc.).

In the example shown in FIG. 2A, drive chain 217 includes a set of pusher units such as pusher units 218a, 218b, 218c, and 218d. The pusher units of the set of pusher units may be disposed at a predetermined distance along drive chain 217. The predetermined distance may be determined based on a dimension of a tray or tray stack. For example, the predetermined distance may be 25% greater than the dimension (e.g., length) of a tray or tray stack. As another example, the predetermined distance may be 10% greater than the dimension (e.g., length) of a tray or tray stack. As another example, the predetermined distance may be 15% greater than the dimension (e.g., length) of a tray or tray stack. As another example, the predetermined distance may be 50% greater than the dimension (e.g., length) of a tray or tray stack. In some embodiments, the predetermined distance between two adjacent pusher units (e.g., pusher unit 218a and pusher unit 218b) is sufficiently large for a vehicle (e.g., a tray stack such as tray stack 222a, 222b, or 222c) to be inserted between the two adjacent pusher units. For example, the predetermined distance is set to be equal to the sum of a dimension of the vehicle (e.g., a length, a width, etc.) and a buffer spacing (e.g., 1 to 6 inches, etc.). In various embodiments, the predetermined distance between the pusher units is configurable. For example, system 200 or a human operator may adjust spacing of pusher units by moving a subset of pusher units and/or by removing a subset of pusher units. The pusher units may be mounted on drive chain 217 (e.g., bolted to a bracket on a link of drive chain 217, etc.), or integral with the drive chain 217 such as by a ridge or other structure.

In various embodiments, the pusher units are configured to provide support for the pushing (e.g., exerting force on) a vehicle such as tray stack 222a, 222b, or 222c. As drive chain 217 is driven (e.g. by a driving sprocket), the pusher units respectively move and cause vehicles with which the pusher units are engaged to move. The pusher unit may be made of various materials such as metals or alloys. The material of the pusher unit may be selected based on a rigidity and/or hardness to ensure that the pusher unit properly moves the vehicles (e.g., the pusher units do not deform when engaged with the vehicle, or deform less than a predetermined deformation threshold). The pusher units may have various profiles that are selected based at least in part on a configuration of an implementation of robotic stack mover system 210. For example, as illustrated in FIG. 2A, pusher units 218*a*, 218*b*, 218*c*, and 218*d* are sufficiently large (e.g., extend from the drive chain) to engage the corresponding vehicle. As another example, pusher units 218*a*, 218*b*, 218*c*, and 218*d* comprise a chamfer at a proximal end of the pusher units 218*a*, 218*b*, 218*c*, and 218*d* (e.g., the end connected to drive chain 217). The chamfer on the pusher units may be configured based on a size and geometry of robotic stack mover system 210 (e.g., the geometry of the drive chain 217 when sufficiently taut between driving unit 212 and tensioning unit 214). For example, the chamfer is configured to ensure that a pusher unit has clearance at driving unit 212 and tensioning unit 214 during recirculation of drive chain 217. As illustrated in FIG. 2A, pusher unit 218*d* is recirculating (e.g., changing direction) at an end of robotic stack mover system 210 at which tensioning unit 214 is located. As pusher unit traverses the curvature of the recirculation, the chamfer ensures provides sufficient clearance between the pusher unit and adjacent pusher units, other links in drive chain 217, etc. In some embodiments, a pusher unit has a chamfer on a distal end (e.g., an end opposing the end attached to the drive chain). For example, pusher unit 238*b* of robotic stack mover system 230 comprises a chamfer at the distal end and the proximal end. A chamfer on the distal end of a pusher unit promotes the insertion/removal of vehicles from a space between adjacent pusher units. For example, the chamfer on the distal end serves to guide stacks of trays into and/or out of the space between adjacent pusher units. In various embodiments, pusher units comprise chamfers at the distal end, the proximal end, or both.

In various embodiments, the tray stacks 220, 222*a*, 222*b*, 222*c* may be pushed manually into an insertion zone. The insertion zone may be located at a beginning of the path which the tray stacks traverse when robotic stack mover system 210 moves the tray stack. For example, as illustrated in FIG. 2A, tray stack 220 is inserted at an end of robotic stack mover system 210 at which driving unit 212 is located. Tray stack 220 may be manually inserted into the insertion zone when a pusher unit is not within the insertion zone (e.g., when the tray stack can be inserted between two adjacent pusher units). In various embodiments, insertion of tray stacks may be automated. For example, an insertion structure may insert tray stacks at a time determined based on one or more of (i) a location of at least one pusher unit (e.g., relative locations of pusher units may be determined if a predetermined spacing between pusher units is known), (ii) a determination that no pusher units are located within insertion zone (e.g., appropriate clearance is provided for proper insertion), (iii) a speed at which drive chain 217 is being inserted, (iv) an order in which tray stacks are to be de-stacked (or filled by stacking of trays, etc.), (v) a manifest corresponding to the particular tray stack (e.g., a list of items on the tray stack, or that are to be loaded onto tray stack), (vi) a state of robot arm 202 or 204, etc. As an example, the insertion structure may comprise a conveyor (e.g., a conveyor belt) that moves the tray stack from a source location to the insertion zone. As another example, a robot may be controlled to insert the tray stack to the insertion zone. Upon insertion of the tray stack to robotic stack mover system 210, robotic stack mover system autonomously advances the source tray stacks (e.g., tray stacks 222*a*, 222*b*, and/or 222*c*) through the workspace (e.g., defined by robotic stack mover system 210 or guide rail 216). In various embodiments, tray stacks may be inserted at other locations where a space between adjacent pusher units is available (e.g., no tray stack occupies the space). For example, tray stack 222*b* may be inserted at its location as robot arm 202 is de-stacking tray stack 222*a* and/or robot arm 204 is de-stacking tray stack 222*c*. In some embodiments, tray stacks are inserted at a spacing that comprises at least N pusher units, where N is an integer. For example, in some implementations tray stacks may occupy adjacent spaces between pusher units such as shown with tray stacks 222*a*, 222*b*, and/or 222*c*. As another example, in some implementations tray stacks are inserted every other set of pusher units such as to avoid adjacent tray stacks, such as shown with tray stack placeholder 222*d*. The tray stack placeholders (e.g., spaces with no tray stacks inserted between adjacent pusher units) may be implemented to provide clearance between tray stacks and to ensure that robotic arms 202, 204 do not collide with adjacent tray stacks while picking and placing items (e.g., trays) to/from tray stacks. In some embodiments, the system uses tray stack placeholders if the system determines that a height of a particular tray stack exceeds a predetermined height threshold.

In some embodiments, tray stacks 222*a*, 222*b*, and/or 222*c* may be advanced through/by robotic stack mover system 210 under robotic control. For example, the speed and times at which the tray stacks 222*a*, 222*b*, and/or 222*c* are advanced by/through robotic stack mover system 210 may be controlled to facilitate efficient grasping of trays from the tray stacks 222*a*, 222*b*, and/or 222*c*.

In the example shown, a single rail (e.g., rail 205) is disposed along one long side of the robotic stack mover system 210. In this example, two robots, one comprising robot arm 202 and another comprising robot arm 204, are mounted movably, independent of one another, on rail 205. For example, each robot arm 202, 204 may be mounted on a self-propelled chassis that rides along rail 205. In various embodiments, each robot arm 202, 204 terminates with an end effector used to perform the kitting operations. In an implementation in which tray stacks are stacked or de-stacked, robot arm 202 or 204 may terminate with a tray handling end effector. In an implementation in which objects are picked and placed from the vehicles, robot arm 202, 204 may terminate with a suction-based end effector, a pincher end effector, etc. The end effector(s) of robot arm 202 and/or robot arm 204 are operated under robotic control. The robotic control may be determined based on a plan for picking/moving/placing the items (e.g., trays) and/or information pertaining to the workspace, such as presence of objects within the range 206 (e.g., workspace) of robot arm 202 or range 208 (e.g., workspace) of robot arm 204

System 200 comprises vision system 245. In various embodiments, vision system 245 obtains the information associated with the workspace of robot arm 202, robot arm 204, or workspace of robotic stack mover system 210 and/or robotic stack mover system 230. Vision system 245 obtains the information associated with the workspace based at least in part on data obtained by one or more sensors (e.g., an image system such as a 2D/3D camera, a laser sensor, an infrared sensor, a sensor array, a weight sensor, etc.). As an example, as illustrated in FIG. 2A, vision system 245 includes a camera 246. Various other types of sensors may be implemented in connection with vision system 245. In various embodiments, system 200 may include a plurality of 3D (or other) cameras, such as camera 246, and may use image and depth data generated by such cameras to generate a three-dimensional view of at least relevant portions of the workspace and scene, such as the scene/state shown in FIG. 2A. In some embodiments, cameras such as camera 246 may be used to identify the contents of trays in source trays comprising a tray stack, e.g., by recognizing the size, shape, packaging, and/or labeling of such items, and/or by recognizing the shape, color, dimensions, or other attributes of the source stack trays themselves and/or by reading bar code, QR code, radio frequency tag, or other image or non-image based information on or emitted by the trays.

In various embodiments, image data generated by vision system 245 such as camera 246 is used to move robotic arms and end effectors into a position near a tray or stack of two or more trays to be grasped and picked up from a source stack and/or to position the tray(s) near a destination at which they are to be place, e.g., at the top of a corresponding destination stack. In some embodiments, force control is used to complete the final phases of a pick/grasp episode and/or a placement episode.

Although a single camera (e.g., camera 246) mounted to a wall in the workspace of system 200 is shown in FIG. 2A, in various embodiments, multiple cameras or other sensors, or a combination thereof, may be mounted statically in a workspace. In addition, or instead, one or more cameras or other sensors may be mounted on or near each robot arm 202, 204, such as on the arm itself, and/or on the end effector of the corresponding robot arm, and/or on a structure that travels with the robot arm 202, 204 as it is moved along rail 205.

A robotic control system (e.g., a computer that controls robot arm 202, robot arm 204, and/or robotic stack mover system 210, such as control computer 248) controls the end effector to actuate the opening/closing of the end effector such as in connection with grasping or releasing a tray and/or the moving of tray stacks 222a, 222b, 222c, such as by driving drive chain 217. The robotic control system controls robotic stack mover system 210 and/or robot arms 202, 204 (e.g., the end effector) based at least in part on (i) image data of the workspace (e.g., obtained using vision system 245), (ii) one or more sensors comprised in (or connected to) the corresponding end effector, and/or (iii) one or more sensors comprised in (or connected to) robotic stack mover system 210 (or robotic stack mover system 230). In some embodiments, the robotic control system controls robotic stack mover system 210 and/or robot arms 202, 204 (e.g., the end effector) based at least in part on information pertaining to one or more tray stacks such as an identifier of the tray stacks, a manifest of the tray stacks, an order corresponding to the tray stacks, etc. In some embodiments, the one or more sensors comprised in (or connected to) the corresponding end effector are configured to: (i) obtain information indicative of whether a gasping mechanism (e.g., an active member) of the end effector is in an open position or a closed position, (ii) obtain information indicative of an extent to which the grasping mechanism is open, (iii) obtain information indicative of when the tray (or end effector relative to the tray) is in a position at which the end effector is controlled to engage at least one side of the end effector (e.g., a passive member or a structure comprised on the passive member) with a hole, a recess, or a handle comprised in a side of a tray (e.g., a tray being grasped), (iv) obtain information indicative of when the tray (or end effector relative to the tray) is in a position at which the end effector (e.g., a passive member or a structure comprised on the passive member) is engaged with the hole, the recess, or the handle comprised in the side of a tray, and/or (v) obtain information indicative of whether the grasping mechanism is closed or otherwise engaged with the tray.

The respective robot arms 202, 204 are operated at the same time, fully autonomously, to pick trays from tray stacks 222a, 222b, and/or 222c and place them on destination tray stacks, such as destination tray stacks 240a, 240b, and/or 240c, in a destination tray stack assembly area on an opposite side of rail 205 from robotic stack mover system 210 and tray stacks 222a, 222b, and/or 222c. The destination tray stacks may be assembled, in various embodiments, according to invoice, manifest, order, or other information. For example, for each of a plurality of physical destinations (e.g., retail stores), a destination stack associated with that destination (e.g., according to an order placed by the destination) is built by selecting trays from respective tray stacks 222a, 222b, and/or 222c and stacking them on a corresponding destination tray stack 240a, 240b, and/or 240c. Completed destination tray stacks 240a, 240b, and/or 240c may be removed from the destination tray stack assembly area, as indicated by arrows, e.g., to be place on trucks, rail cars, containers, etc. for delivery to a further destination, such as a retail store.

In various embodiments, system 200 comprises robot stack mover system 230 such as in connection with moving destination tray stacks 240a, 240b, 240c (e.g., along a path corresponding to a direction of a guide rail 236 of robot stack mover system 230, or a direction of rail 205 along which robot arms 202, 204 traverse. Robot stack mover system 230 may be implemented to provide a structure to move destination tray stacks 240a, 240b, 240c to facilitate moving stacks within range of a particular robot arm, or to allow insertion of additional destination tray stacks as other destination tray stacks are completed. As an example, if tray stack 222a comprises a tray including objects different from tray stacks 222b, 222c, and system 200 determines that a set of such objects are to be placed on destination tray stack 240c, system 200 may control robotic stack mover system 230 to move destination tray stack 240c to within range 206 of robot arm 202 (e.g., because tray stack 222a is within range of robot arm 202 but robot arm 202 is unable to reach destination tray stack 240c in the example shown in FIG. 2A).

Referring further to FIG. 2A, in the example shown in the system 200 includes a control computer 248 configured to communicate wirelessly with robotic elements comprising system 200, including in various embodiments one or more of: robotic stack mover system 210; robotic stack mover system 230; the wheeled chassis on which tray stacks 222a, 222b, and/or 222c are stacked (if self-propelled); the robot arms 202, 204 and/or the respective chassis on which the robot arms 202, 204 are mounted on rail 205; and the robotically controlled end effectors of robot arms 202, 204. In various embodiments, the robotic elements are controlled by control computer 248 based on input data, such as an invoice, an order, and/or manifest information, as well as input state information (e.g., information pertaining to the workspace such as obtained by vision system 245), such as inventory data indicating which source tray stacks include which type and/or quantity of product.

Tray stacks 222a, 222b, 222c may be inserted into a gate or other ingress/control structure at the input end of robotic stack mover system 210 (e.g., where tray stack 220 is inserted into robotic stack mover system 210). Robotic stack mover system 210 moves the tray stacks 222a, 222b, 222c along a path defined by a direction of rail 205 (or guide rail 216) to optimize throughput and minimize robot displacement, e.g., by minimizing how far and/or often the robot arms 202, 204 must be moved along rail 205 to grasp source trays and place them on respective destination stacks. The tray stacks 222a, 222b, 222c can come in with trays in different orientations/weights/and weight distribution. System 200 uses force and moment control to operate robot arms 202, 204 to insert a thumb or other protrusion gently and securely into a tray and plans its motion and tray trajectory in order to not collide with itself or the environment. In various embodiments, each robot arm 202, 204 operates in a very tight space of roughly 2.5 m in width and has a very light footprint. The robot (e.g., via control of control computer 248) utilizes its full workspace and intelligently plans its motion optimizing its grasp and/or efficiency (e.g., time, collision avoidance, etc.) in de-stacking the tray stacks 222a, 222b, and/or 222c. System 200 (e.g., control computer 248) recognizes the need to perform orientation changes and handles that accordingly while avoiding obstacles. The robot moves to the correct output (destination tray stack 240a, 240b, 240c) corresponding to the right customer while coordinating with the other robots on the rail 205. System 200 then uses advanced force control and interactions with the environment to figure out a proper place strategy. The cycle then restarts.

Robotic stack mover system 230 may be similar to robotic stack mover system 210. For example, robotic stack mover system 230 includes driving unit 232, tensioning unit 234, guide rail 236, drive chain 237, and a set of pusher units such as pusher units 238a, 238b, and 238c. In various embodiments, a robotic stack mover system includes a driving unit and a tensioning unit disposed at opposing ends of a guide rail. As illustrated using robotic stack mover system 210 and robotic stack mover system 230, sides at which the driving units and tensioning units are respectively located may be interchangeable.

Although in the example shown in FIG. 2A system 200 comprises robotic stack mover system 210 and robotic stack mover system 230, in various embodiments, system 200 includes one robotic stack mover system, or system 200 is configured such that a robotic stack mover system is not included on a side of robot opposite another side of the robot arm that includes a robotic stack mover system (e.g., system 200 includes robotic stack mover system 210 but does not include robotic stack mover system 230). Examples of implementations in which robotic stack mover systems are not placed on opposing sides of a robot arm include a system configured to obtain trays from a conveyance structure (e.g., a conveyor, a chute, etc.) to stack trays on vehicles (e.g., tray stacks 222a, 222b, 222c, etc.), or a system configured to de-stack trays from the vehicles (e.g., tray stacks 222a, 222b, 222c, etc.) and to place the respective trays on a conveyance structure to transport the trays to another area of a facility (e.g., the robot arms singulate the trays obtained from the vehicles). In such implementations, the system comprises a conveyance structure on a side of robot arms 202, 204 that opposes the side of robot arms 202, 204 on which robotic stack mover system 210 is disposed. Another example of an implementation in which in which robotic stack mover systems are not placed on opposing sides of a robot arm includes a system in which robot arms are controlled to stack trays or kit sets of items (e.g., objects) from a shelf system or a conveyance system that provides (e.g., carries) the items to the workspace of the robot arms. An example of such an implementation is illustrated in FIG. 2C.

Figure 2B:
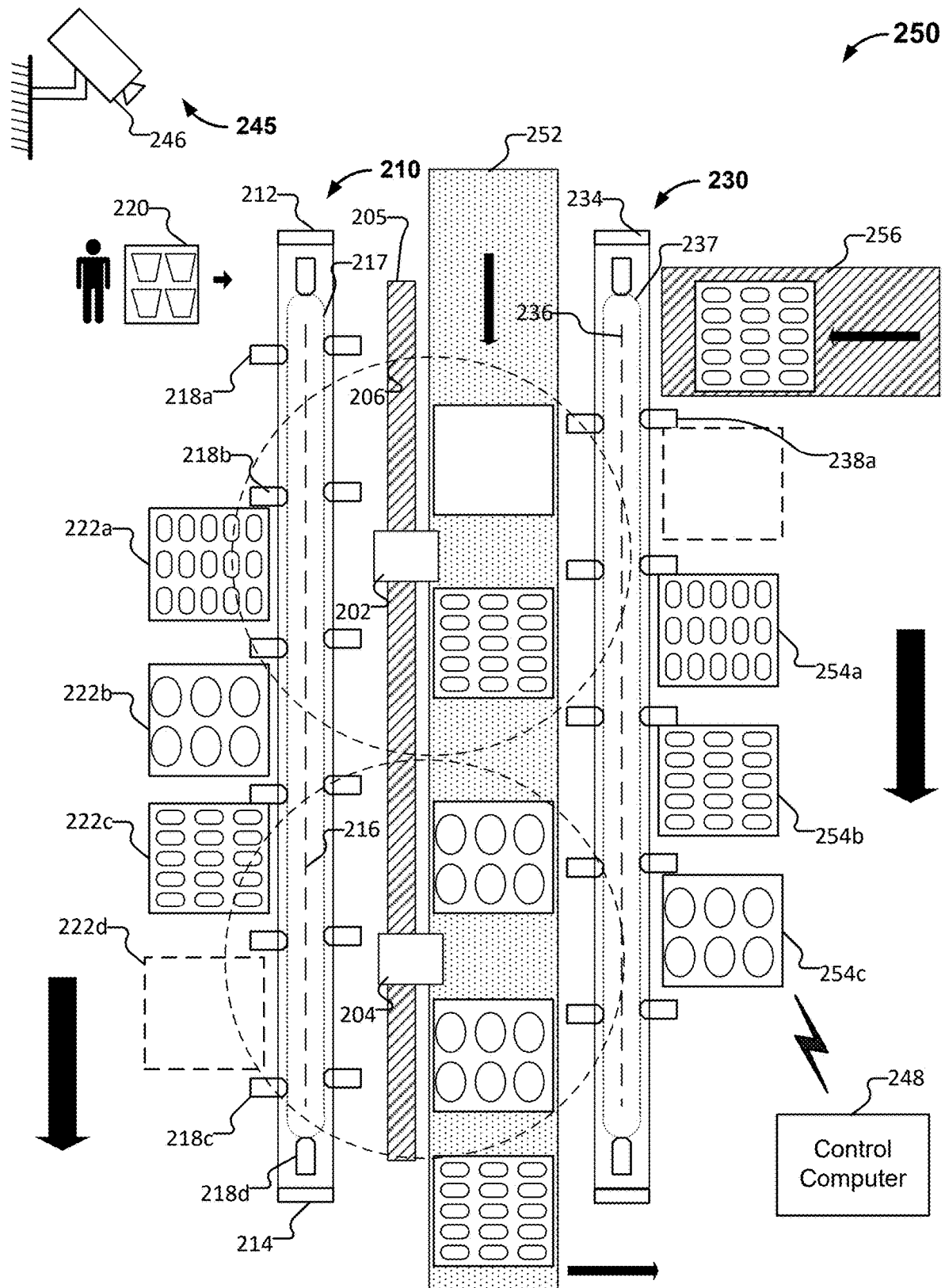
FIG. 2B is a block diagram illustrating an embodiment of a robotic line kitting system.
Figure 2C:
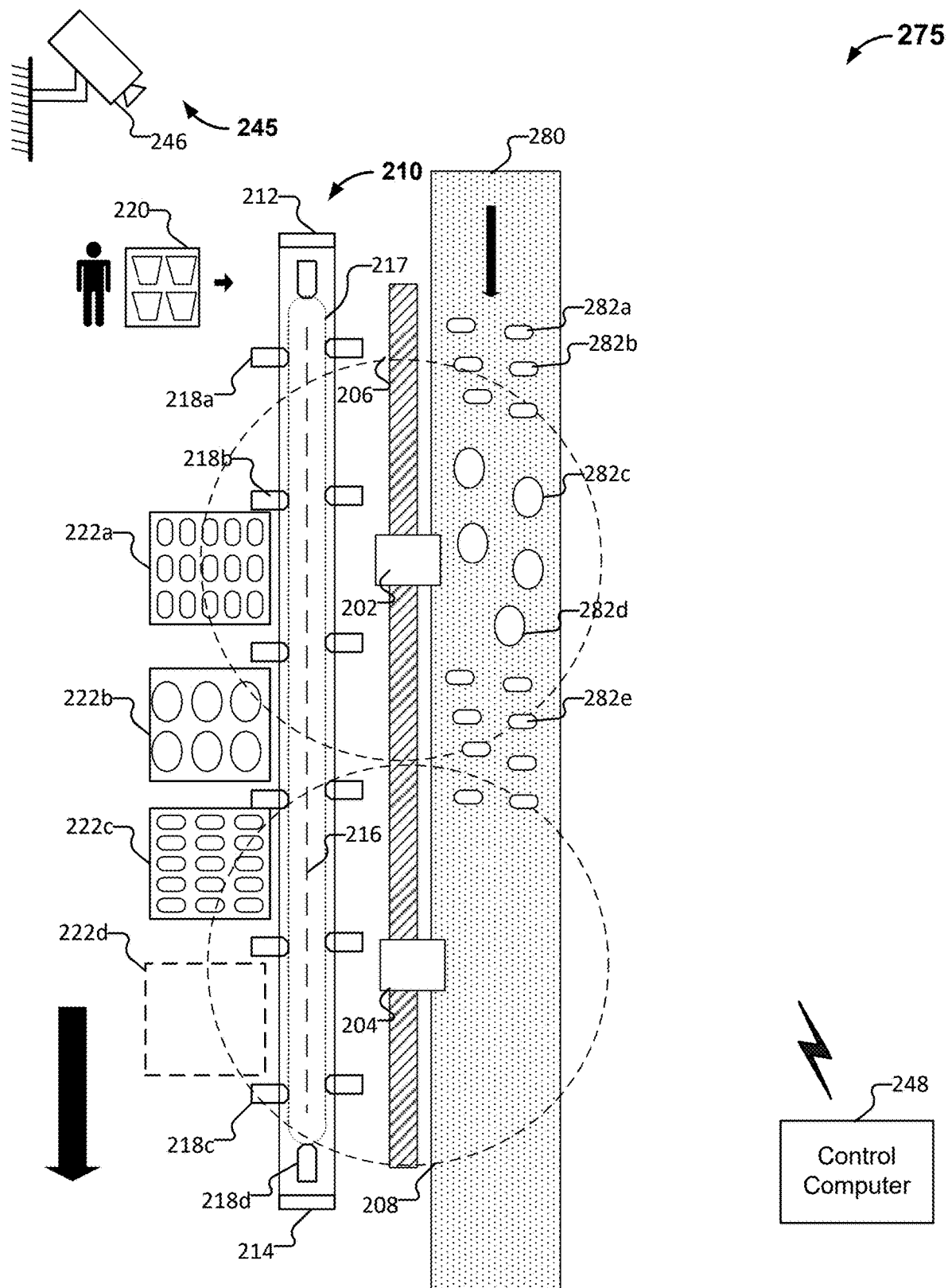
FIG. 2C is a block diagram illustrating an embodiment of a robotic line kitting system.

FIG. 2B is a block diagram illustrating an embodiment of a robotic line kitting system. In the example shown in FIG. 2B, tray stacks are inserted on opposing sides of rail 205. In various embodiments, robot arms 202 and 204 are controlled to perform kitting operations with respect to tray stacks 222a, 222b, 222c, 254a, 254b, and/or 254c.

In various embodiments, robot arms 202 and 204 are controlled to de-stack items (e.g., trays) with respect to tray stacks 222a, 222b, 222c, 254a, 254b, and/or 254c. Robot arms 202 pick trays from tray stacks 222a, 222b, 222c, 254a, 254b, and/or 254c and place the trays on a conveyance structure 252, which carries the de-stacked/unloaded trays to a destination location (e.g., another area of a facility). Robotic stack mover system 210 and robotic stack mover system 230 respectively move tray stacks 222a, 222b, and 222c, and tray stacks 254a, 254b, 254c such as to facilitate the de-stacking operation (e.g., to optimize efficiency for robot arms 202, 204 to de-stack the tray stacks, or to provide space for insertion of another tray stack, etc.).

In various embodiments, robot arms 202 and 204 are controlled to stack items (e.g., trays) with respect to tray stacks 222a, 222b, 222c, 254a, 254b, and/or 254c. Robot arms 202 can pick trays delivered via conveyance structure 252 and place the trays on tray stacks 222a, 222b, 222c, 254a, 254b, and/or 254c. The tray stacks 222a, 222b, 222c, 254a, 254b, and/or 254c may be stacked according to a manifest such as an order or invoice. Robotic stack mover system 210 and robotic stack mover system 230 respectively move tray stacks 222a, 222b, and 222c, and tray stacks 254a, 254b, 254c such as to facilitate the stacking operation (e.g., to optimize efficiency for robot arms 202, 204 to stack the tray stacks, or to provide space for insertion of another tray stack, etc.).

As illustrated in FIG. 2B, system 250 may include an autonomous tray stack insertion unit 256. The autonomous tray stack insertion unit 256 can be a conveyance structure, such as a conveyor. System 250 (e.g., via control computer 248) controls autonomous tray stack insertion unit 256 to insert tray stacks to a space between adjacent pusher units. System 250 may control autonomous tray stack insertion unit 256 based on a state of robotic stack mover system 230 or a state of one or more tray stacks engaged by robotic stack mover system 230 (e.g., tray stacks 254a, 254b, and/or 254c). As an example, if system 250 comprises a tray stack insertion zone comprising autonomous tray stack insertion unit 256, system 250 may determine to insert a new tray stack in response to a determination that a kitting operation has been completed with respect to tray stack 254c (which can be moved to a vehicle return area), such as a determination that a manifest or packing list for tray stack 254c is completed, or the tray stack has reached a threshold height.

FIG. 2C is a block diagram illustrating an embodiment of a robotic line kitting system. In the example shown in FIG. 2C, system 275 comprises robotic stack mover system 210 and a conveyance structure 280. Robotic stack mover system 210 and a conveyance structure 280 are located on opposing sides of the rail along which robot arms 202, 204 traverse. In various embodiments, robot arms 202 and 204 are controlled to perform kitting operations with respect to tray stacks 222a, 222b, 222c, 254a, 254b, and/or 254c. For example, robot arms 202, 204 pick objects (e.g., objects such as 282a, 282b, 282c, 282d, or 282e) from conveyance structure 280 and place the objects on tray stacks 222a, 222b, and/or 222c. As another example, robot arms 202, 204 pick objects from tray stacks 222a, 222b, and/or 222c and place the objects on conveyance structure 280, which carries the objects to a corresponding destination location.

Although in the examples shown in FIGS. 2A, 2B, and 2C the trays each contain only one type of object, in various embodiments and applications source and destination trays having mixes of items may be handled to assemble destination stacks of trays as disclosed herein. Similarly, although in the examples shown in FIGS. 2A, 2B, and 2C the source stacks of trays each contain only trays of the same type and content, in other embodiments and applications source tray stacks may include a mix of trays and/or item types. For example, the control computer 248 may be provided with information indicating which types of tray are in which position in each source tray stack, and may use that information, along with manifest or other information indicating the required contents of each destination tray stack, to build the required destination tray stacks by picking needed trays each from a corresponding position on a source tray stack and adding the tray to a corresponding destination stack.

Figure 3A:
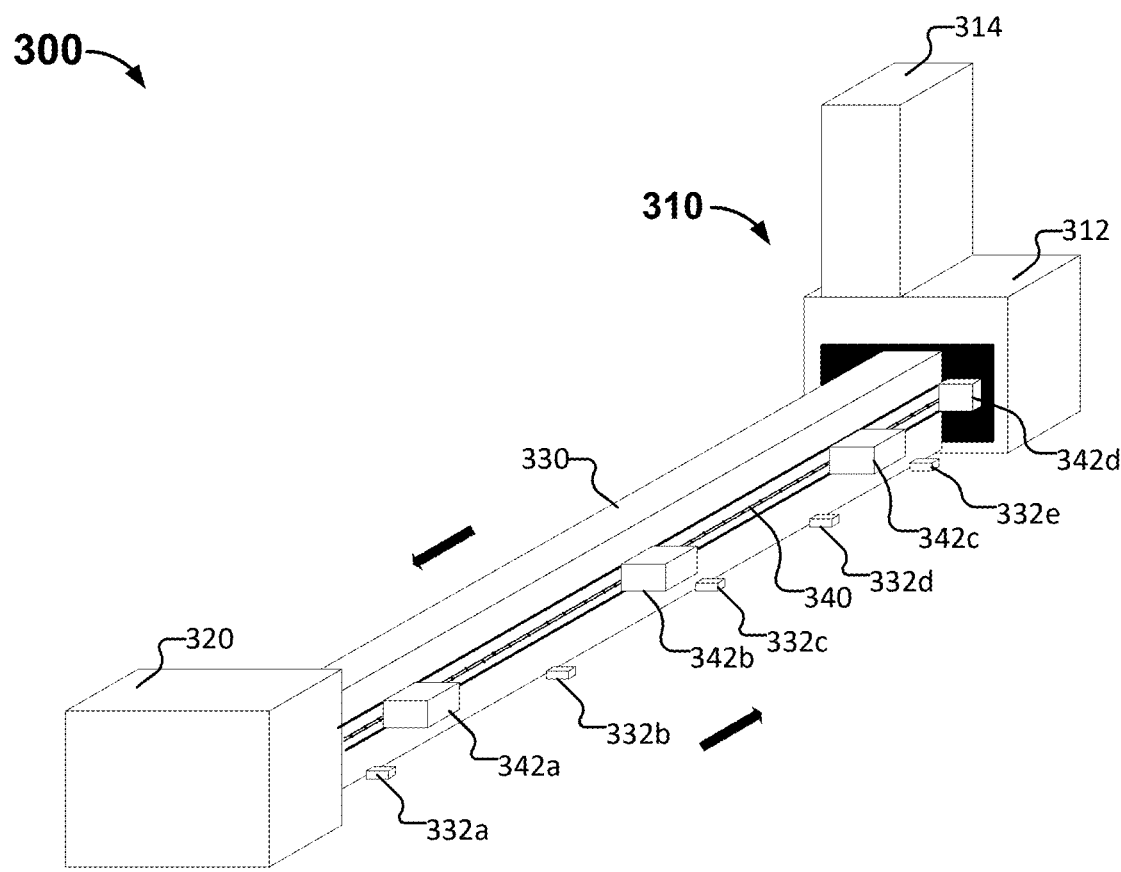
FIG. 3A is a block diagram illustrating an embodiment of a stack mover system.

FIG. 3A is a block diagram illustrating an embodiment of a stack mover system. In the example shown in FIG. 3A, system 300 comprises driving unit 310 and tensioning unit 320. Driving unit may comprise support structure 312 and motor 314. Motor 314 is configured to control movement of drive chain 340 along the path defined by guide rail 330. In various embodiments, system 300 comprises a set of rail feet, such as rail feet 332a, 332b, 332c, 332d, and/or 332e to provide support for system 300. The rail feet may be bolted to a surface on which system 300 is located, such as a factory floor.

In various embodiments, rail feet supports two guide rails side-by-side: a first guide rail in which part of drive chain 340 travels from tensioning unit 320 to driving unit 310 (e.g., a drive end), and a second guide rail in which part of drive chain 340 travels from driving unit 310 to tensioning unit 320. As an example, drive chain 340 is guided through the entire system 300. For example, as illustrated in FIG. 3A, the drive chain 340 enters the support structure of driving unit 310 or tensioning unit 320 to change a direction of drive chain 340 and to recirculate the drive chain within system 300. In various embodiments, one guide rail is used to engage a vehicle (e.g., pull/push a vehicle along the path), and another guide rail is used to recirculate drive chain 340. The guide rails may be a channel in which a drive chain 340 is located, and the pusher units may be mounted to the drive chain 340 and to extend to an exterior of the guide rails. Drive chain 340 comprises a set of pusher units, such as 342a, 342b, 342c, and 342d. As illustrated, pusher unit 342d is being moved into support structure 312 of driving unit 310 at which pusher unit 342 will recirculate to begin moving towards tensioning unit 320. Drive chain 340 may be a double pitch chain to which pusher units 342a, 342b, 342c, and 342d are mounted.

According to various embodiments, a pusher unit comprises (or corresponds to) a drive bracket that is configured to be mounted to the drive chain. The drive bracket is mounted to the drive chain at a proximal end of the drive bracket. In various embodiments, the drive bracket comprises one or more chamfers to provide clearance of the drive bracket as the drive bracket traverses the robotic stack mover system, or to promote insertion of a vehicle between two adjacent drive brackets (e.g., to guide the vehicle to the space between the two adjacent guide brackets).

Figure 3B:
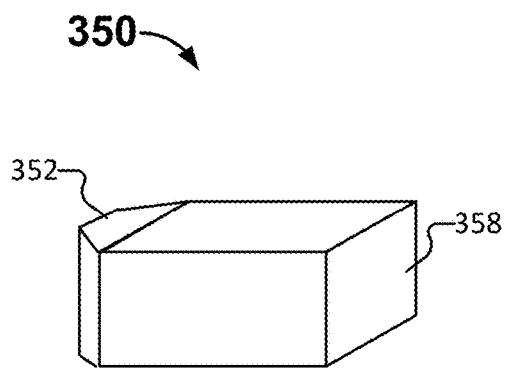
FIG. 3B is a diagram illustrating an embodiment of a drive bracket of a stack mover system.
Figure 3C:
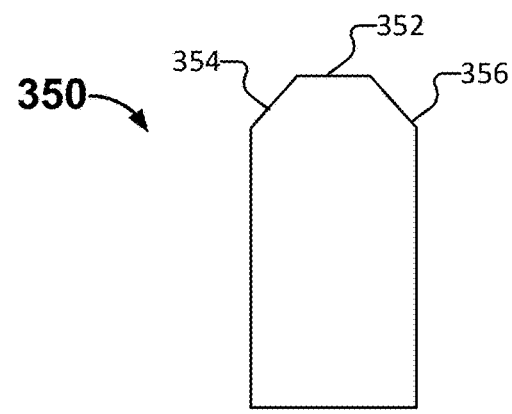
FIG. 3C is a diagram illustrating an embodiment of a drive bracket of a stack mover system.

FIG. 3B is a diagram illustrating an embodiment of a drive bracket of a stack mover system. FIG. 3C is a diagram illustrating an embodiment of a drive bracket of a stack mover system. As illustrated in FIGS. 3B and 3C, drive bracket 350 comprises a proximal end 352 and a distal end 358. Drive bracket 350 comprises one or more chamfers 354, 356, at proximal end 352, which is connected to the drive chain such as by mounting bolt(s). Chamfers 354 and 356 may be configured to provide clearance for the drive brackets as the drive brackets move within the robotic stack mover system (e.g., to avoid collisions with a structure of robotic stack mover system such as a driving sprocket or tensioning sprocket, or the drive chain or adjacent drive bracket).

Figure 3D:
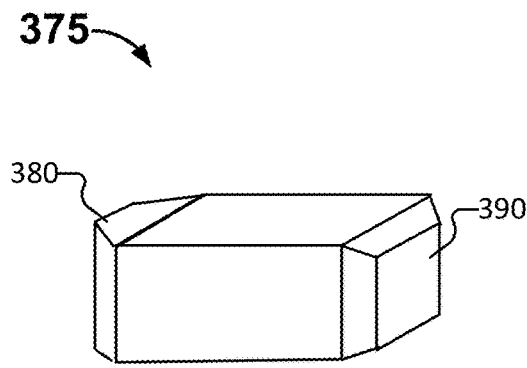
FIG. 3D is a diagram illustrating an embodiment of a drive bracket of a stack mover system.
Figure 3E:
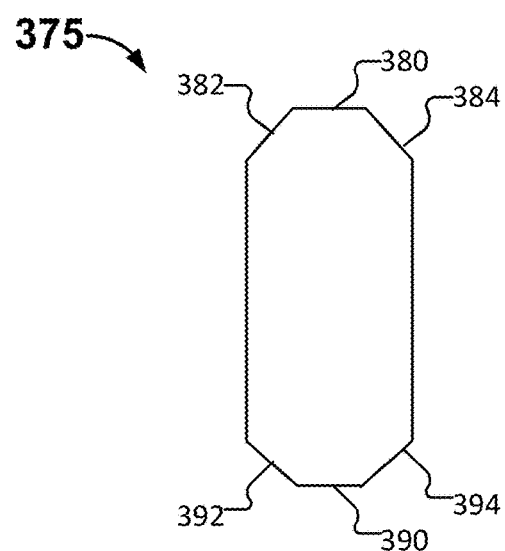
FIG. 3E is a diagram illustrating an embodiment of a drive bracket of a stack mover system.

FIG. 3D is a diagram illustrating an embodiment of a drive bracket of a stack mover system. FIG. 3E is a diagram illustrating an embodiment of a drive bracket of a stack mover system. As illustrated in FIGS. 3D and 3E, drive bracket 375 comprises one or more chamfers 382, 384 at proximal end 380, which is connected to the drive chain such as by mounting bolt(s), and one or more chamfers 392, 394 at distal end 390. Chamfers 392 and 394 may be configured to assist with guiding a vehicle into a space between two adjacent drive brackets of the robotic stack mover system.

Figure 4A:
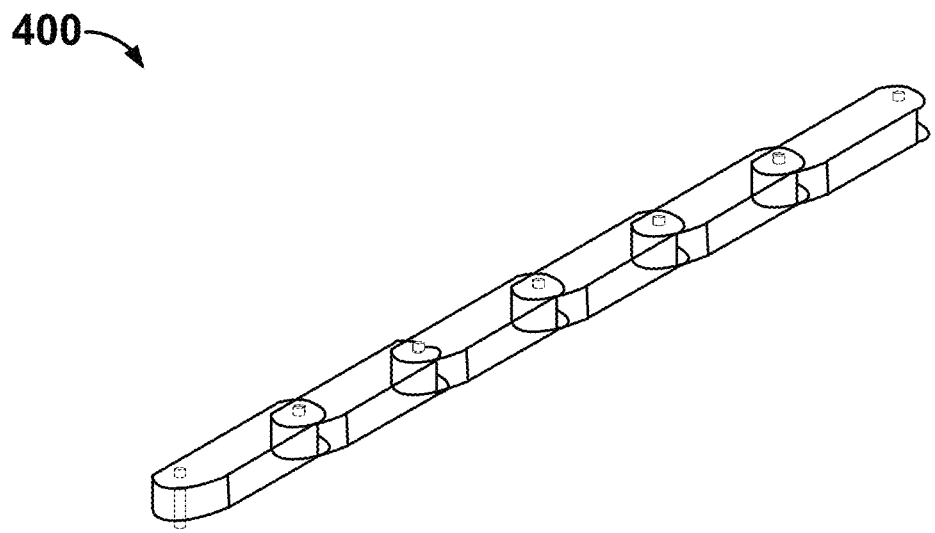
FIG. 4A is a diagram illustrating an embodiment of a drive chain.

FIG. 4A is a diagram illustrating an embodiment of a drive chain. In the example illustrated, drive chain 400 is a double pitched chain. In various embodiments, the drive chain may be made of a metal, metal alloy, or such other material to provide sufficient rigidity and/or hardness to engage with the driving unit and/or tensioning unit, and/or sufficient to withstand forces transferred to the drive chain via the vehicles being moved with the drive chain.

Figure 4B:
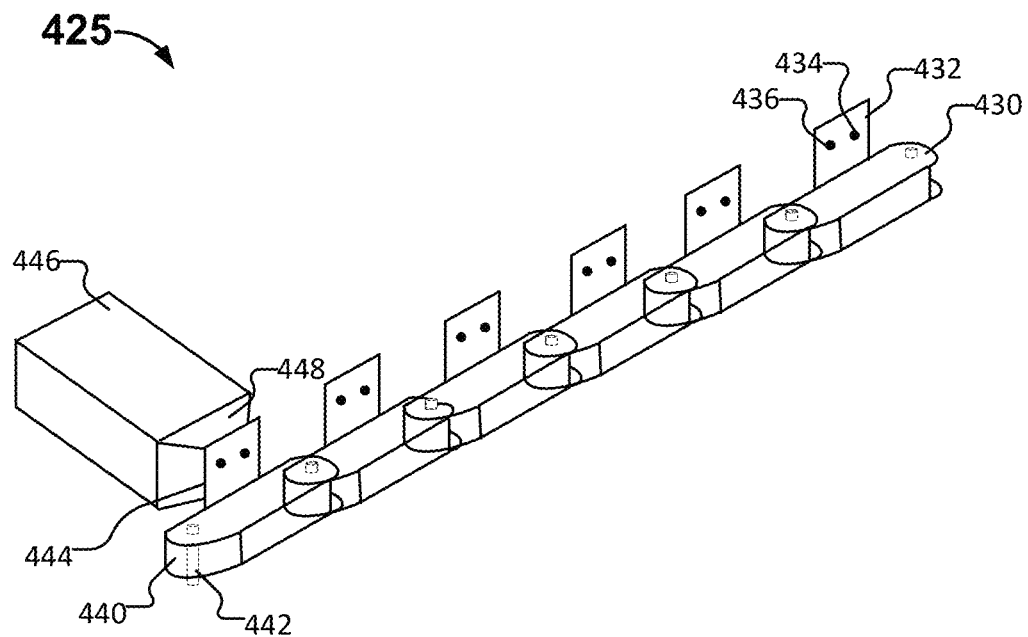
FIG. 4B is a diagram illustrating an embodiment of a drive chain.

FIG. 4B is a diagram illustrating an embodiment of a drive chain. In the example shown in FIG. 4B, drive chain 425 is a double-pitched chain comprising a set of links such as links 430, 440. In various embodiments, a link comprises a mounting bracket such as mounting bracket 432 on link 430, or mounting bracket 444 on link 440. In some implementations, each link comprises a mounting bracket. In other implementations, a subset of the links comprise a mounting bracket, such as every M links of the drive chain comprises a mounting bracket, where M is a positive integer. If the drive chain comprises mounting brackets at each link, the robotic stack mover system is relatively more extensible because a greater number of configurations of drive brackets may be set (e.g., drive brackets can be mounted to each link, or to every N links, where N is a positive integer).

As shown, a drive bracket 446 is mounted to the mounting bracket 444 of link 440 of drive chain 425. In some embodiments, the mounting brackets comprise one or more through holes via which the drive bracket is mounted (e.g., through holes 434 and 436 comprised in mounting bracket 432). Drive bracket 446 is mounted to mounting bracket 444 at proximal end 448 of drive bracket 446. In various embodiments, proximal end 448 of drive bracket 446 comprises a chamfer.

The links of drive chain 425 may be connected via pins such as pin 442 of link 440. The pins connect each link and are configured to pivot within the holes connecting the corresponding links to provide a degree of flexibility of drive chain 425.

Figure 4C:
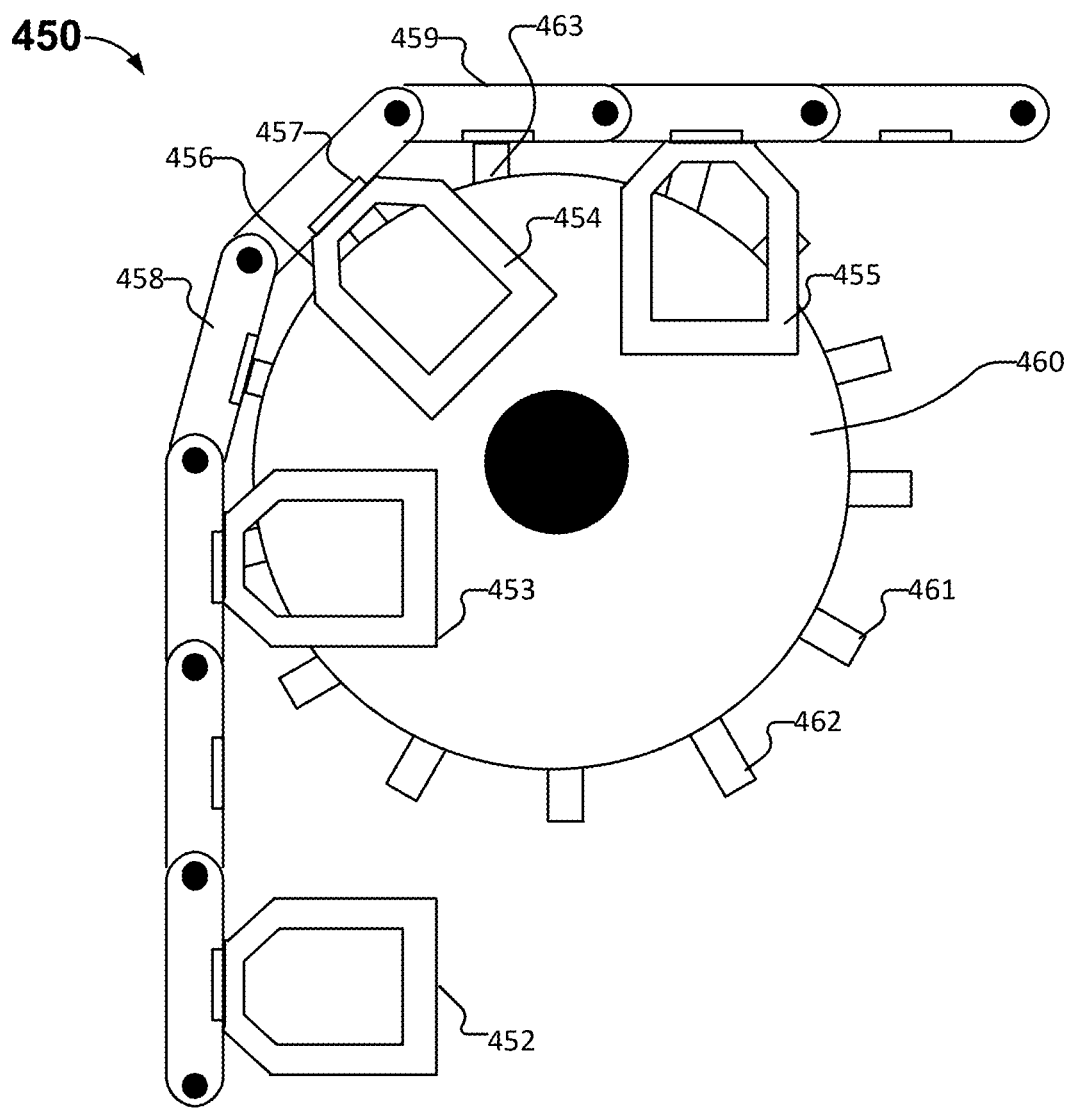
FIG. 4C is a diagram illustrating an embodiment of an assembly of a drive chain and drive bracket.

FIG. 4C is a diagram illustrating an embodiment of an assembly of a drive chain and drive bracket. In the example shown in FIG. 4C, drive chain assembly 450 is illustrated in a configuration in which the drive chain is engaged by sprocket 460 such as a driving sprocket or a tensioning sprocket. As illustrated, sprocket 460 comprises a plurality of teeth, such as teeth 461, 462, and 463. The teeth of sprocket 460 are configured to engage with (e.g., be inserted into) a hole or recess of a link. For example, tooth 463 is shown to be engaged with link 458. Drive chain assembly 450 comprises a plurality of drive brackets such as drive brackets 452, 453, 454, and 455. For example, drive bracket 454 is mounted via mounting bracket 457. As shown, the drive brackets are mounted to every other link of the drive chain. In various embodiments, drive brackets are mounted to every link of the drive chain, every third link of the drive chain, etc.

According to various embodiments, a drive bracket comprises one or more chamfers, such as chamfer at a proximal end of the drive bracket (e.g., the end mounted to a mounting bracket), and/or a chamfer at a distal end of the drive bracket. In the example illustrated in FIG. 4C, drive bracket 454 comprises chamfer 456 at proximal end of drive bracket 454. As an example, chamfer 456 provides a clearance to ensure that drive bracket 454 does not collide or otherwise obstruct an adjacent link such as links 458 and 459. Chamfer 456 promotes a clearance between other components of the robotic stack mover system (e.g., drive chain assembly 450) such as when the drive chain is bending (e.g., when the drive chain is engaging a sprocket such as sprocket 460 and changing a direction, for example when the drive chain is being recirculated).

Figure 4D:
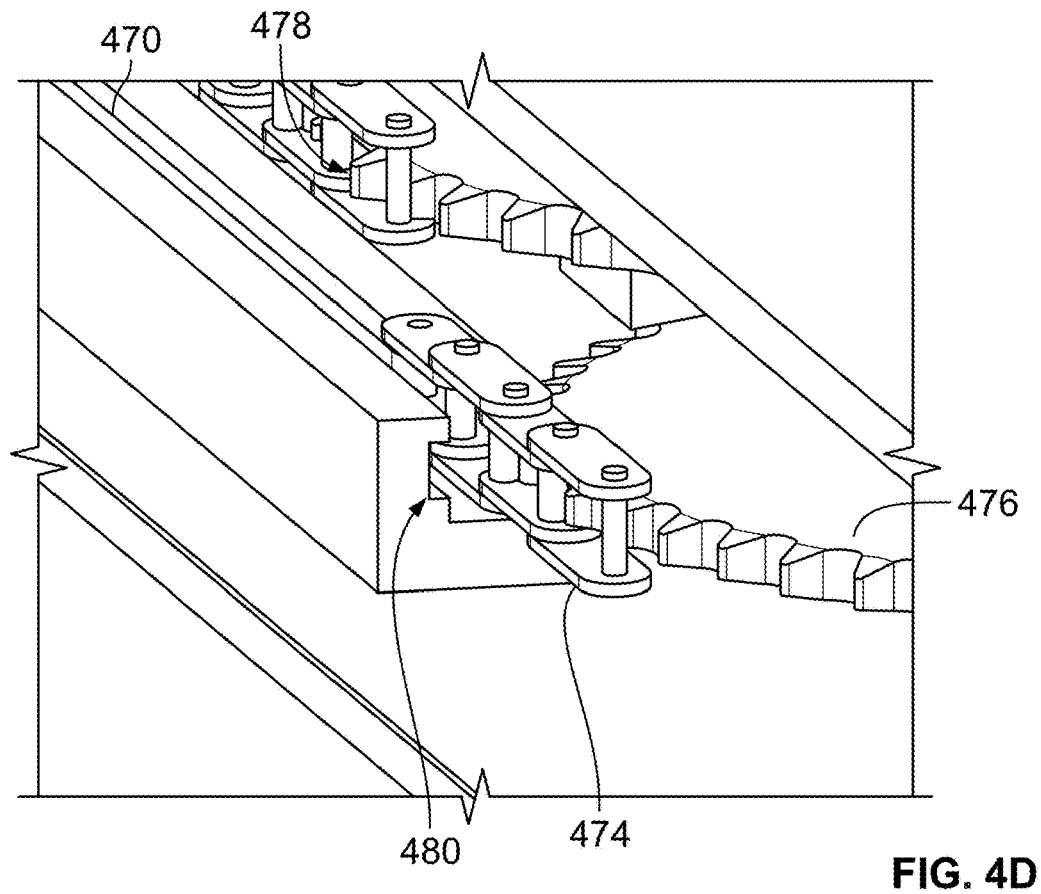
FIG. 4D is a diagram illustrating an embodiment of a drive chain of a robotic stack mover system.

FIG. 4D is a diagram illustrating an embodiment of a drive chain of a robotic stack mover system. According to various embodiments, one or more of the ends of the guide rails (e.g., an end at a driving end, an end at a tensioning end) are configured to be located (e.g., to terminate) in relatively close proximity of a corresponding sprocket, such as a driving sprocket at the driving end or a tensioning sprocket at a tensioning end. The location of the end(s) of the guide rails are configured to provide support of the drive chain as the drive chain engages a sprocket, or disengages the sprocket (e.g., as the part of the chain leaves the driving end or tensioning end). The location of the ends(s) of the guide rails are configured to be sufficiently close to the corresponding sprocket to prevent sagging in the drive chain, or otherwise prevent the drive chain from disengaging from the corresponding sprocket, while also providing sufficient clearance for the sprocket to be unobstructed by the guide rail.

In the example illustrated in FIG. 4D, guide rail 470 provides support for drive chain 474. As drive chain 474 exits guide rail 470, drive chain engages with sprocket 476, such as a driving sprocket at a driving end of the robotic stack mover system. The guide rail 470 is configured such that a terminating end 480 of guide rail is in close proximity to sprocket 476 to provide support for drive chain 474 as drive chain transitions from being supported by (or travelling along) guide rail 470 to engage sprocket 476. Drive chain 474 engages sprocket 476 as drive chain 474 enters the corresponding end of the robotic stack mover system (e.g., a support structure of a driving unit, or a support structure of a tensioning unit). In some embodiments, sprocket 476 is used in connection with recirculating drive chain 474 to change direction and to begin moving towards the other end of robotic stack mover system as indicated at drive chain end 478.

Figure 4E:
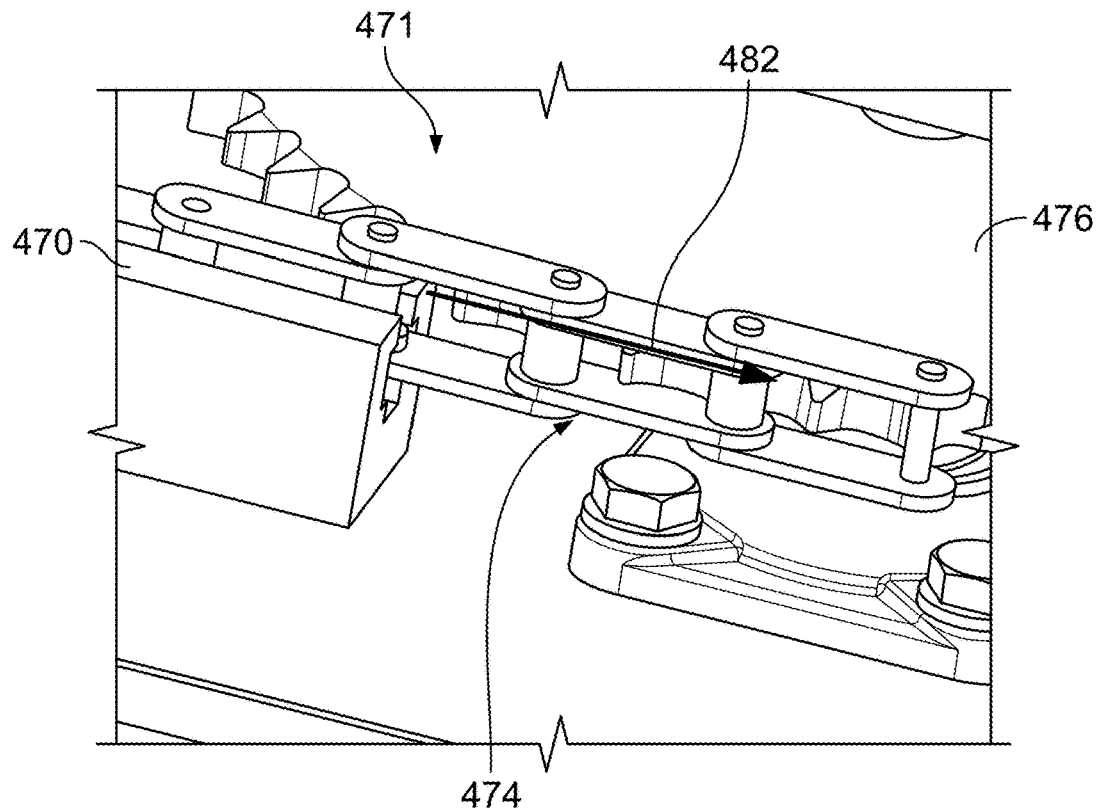
FIG. 4E is a diagram illustrating an embodiment of a drive chain of a robotic stack mover system.

FIG. 4E is a diagram illustrating an embodiment of a drive chain of a robotic stack mover system. As shown in the example illustrated in FIG. 4E, as drive chain 474 exits guide rail 470 in a direction 471, drive chain 474 engages sprocket 476 and sprocket 476 guides drive chain along direction 482.

Figure 5A:
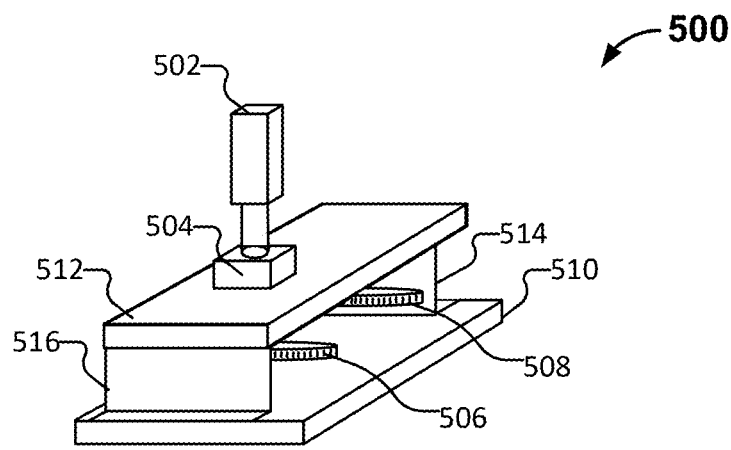
FIG. 5A is a diagram illustrating an embodiment of a driving unit of a robotic stack mover system.
Figure 5B:
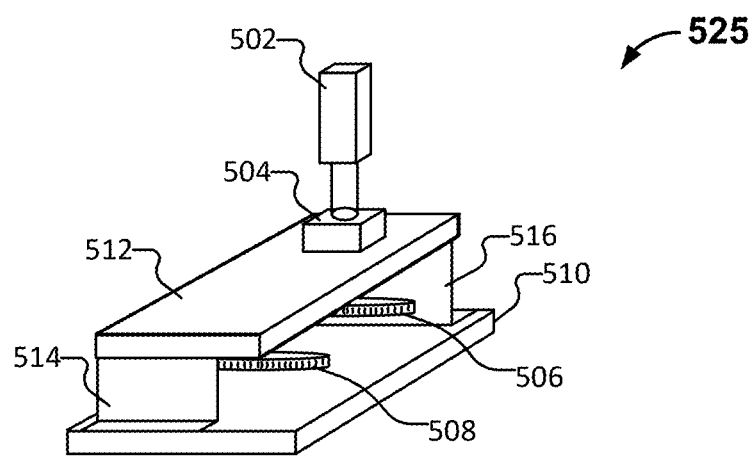
FIG. 5B is a diagram illustrating an embodiment of a driving unit of a robotic stack mover system.

FIG. 5A is a diagram illustrating an embodiment of a driving unit of a robotic stack mover system. FIG. 5B is a diagram illustrating an embodiment of a driving unit of a robotic stack mover system. As illustrated in FIGS. 5A and 5B, driving unit 500 and driving unit 525 may have different configurations, such as based on an end of the robotic stack mover system at which the corresponding driving unit is to be deployed. As an example, driving unit 500 may correspond to a right-end driving unit, and driving unit 525 may correspond to a left-end driving unit.

According to various embodiments, the driving unit is designed to be extensible for deployment in different configurations. Driving units for different configurations may comprise the same set of components, and an arrangement of the set of components may be modified based on an orientation of the driving unit relative to the robotic stack mover system. For example, driving unit 500 and driving unit 525 respectively comprise a motor 502, a driving sprocket 506, an idler sprocket 508, a bottom support 510 (e.g., a bottom plate), a top support 512 (e.g., a top plate), a first side support 514 (e.g., a first side plate), and a second side support 516 (e.g., a second side plate). Driving unit 500 and driving unit 525 may further include gear box 504. In some embodiments, motor 502 is a high torque motor, and gearbox 504 couples and drives driving sprocket 506. Motor 502 is connected to driving sprocket 506 such that when motor 502 is driven the motor causes driving sprocket 506 to rotate. When a drive chain is engaged with driving sprocket 506, rotation of driving sprocket 506 correspondingly causes the drive chain to move (which can correspondingly cause a vehicle engaged with a pusher unit to also move). The support structure of the driving unit (e.g., bottom support 510, top support 512, first side support 514, and second side support 516) may be made of a metal such as aluminum, steel, or other metallic alloy, or other material that is sufficiently strong to support the driving unit and protect components operating within the driving unit.

The design of the driving unit to use a same set of components for different configurations of the driving unit promotes a more efficient manufacturability of driving units. For example, a greater level of economic efficiencies may be attained in the manufacture of such driving units.

Figure 5C:
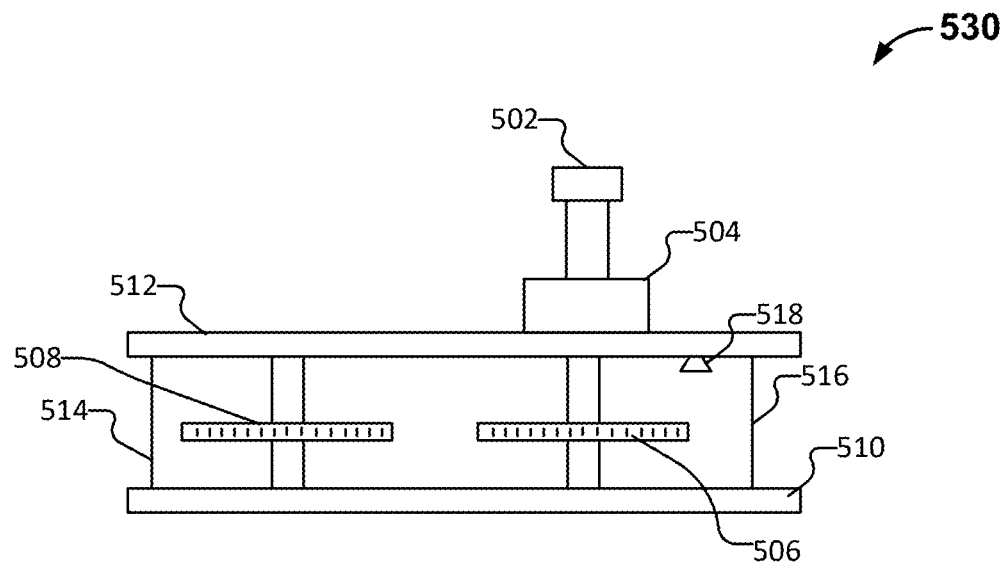
FIG. 5C is a diagram illustrating an embodiment of a driving unit of a robotic stack mover system.

FIG. 5C is a diagram illustrating an embodiment of a driving unit of a robotic stack mover system. As illustrated in FIG. 5C, driving unit 530 may further include one or more sensors such as sensor 518. The robotic stack mover system can use information obtained by the one or more sensors in connection with calibrating the system. For example, at least one of the one or more sensors may be configured to obtains information pertaining to an alignment of the drive chain, such as a pusher unit mounted to the drive chain. The one or more sensors can detect a location or presence of at least one of the set of pusher units. Sensor 518 may be a sensor array, a reflective sensor, etc. that detects a location/presence of a pusher unit (e.g., a driving bracket). Various other types of sensors may be implemented.

The system uses one or more sensors to calibrate a positioning of one or more pusher units that are used to move vehicles throughout the system (e.g., along a path in a direction that is the same as a direction of a length of a guide rail). The system calibrates the one or more pusher units in connection with ensuring that the system has knowledge of a location of at least one of the one or more pusher units and/or relative locations of one or more other pusher units. Calibration of the system ensures that the system can determine a location of a pusher unit, and by extension, a location (or relative location) of a vehicle (e.g., a cart, dolly, etc.). Upon calibration, the system is able to keep track of a location of a vehicle, determine a number of vehicles that are engaged by the system (e.g., engaged by a respective pusher unit for control of moving the vehicle), etc.

According to various embodiments, driving unit 530 is implemented in connection with driving unit 212 and/or driving unit 232.

Figure 5D:
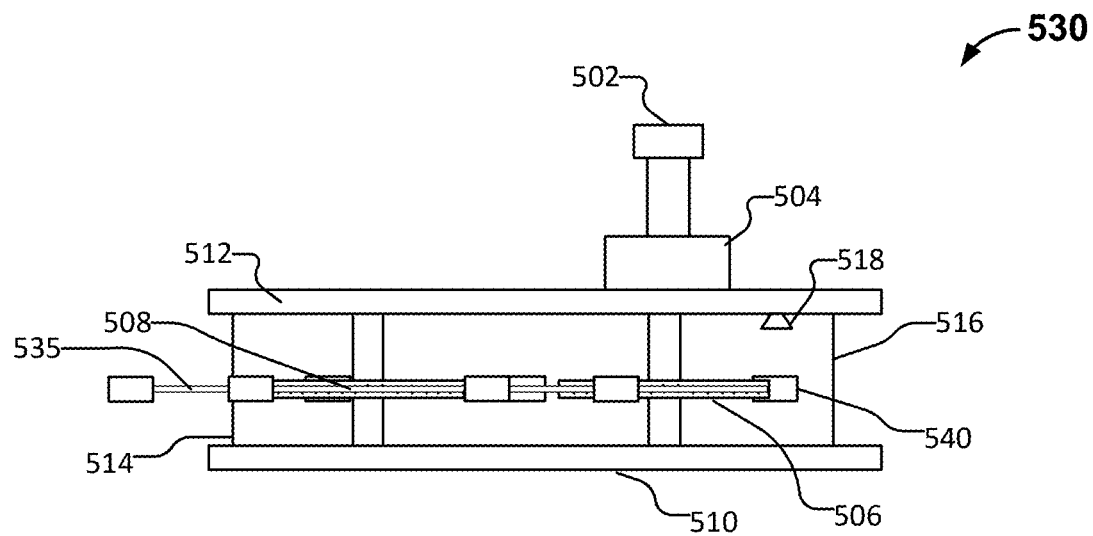
FIG. 5D is a diagram illustrating an embodiment of a driving unit of a robotic stack mover system.

FIG. 5D is a diagram illustrating an embodiment of a driving unit of a robotic stack mover system. In the example illustrated in FIG. 5D, a drive chain 535 engages driving unit 530. For example, drive chain 535 has exited the guide rail at an entry of the driving unit, and drive chain 535 traverses one or more sprockets such as driving sprocket 506 and idler sprocket 508. The one or more sprockets may be configured to change a direction in which drive chain 535 travels after recirculation of drive chain 535. Although driving unit 530 is illustrated to comprise two sprockets, various embodiments can implement different number of sprockets.

Drive chain 535 comprises a set of pusher units (e.g., driving brackets) such as pusher unit 540. Sensor 518 can be configured to detect pusher unit 540 or to determine a position of pusher unit 540. Sensor 518 can be mounted to a bottom surface of top support 512. As an example, the system uses sensor 518 to determine when pusher unit 540 passes a predefined location. The sensor 518 may detect one or more edges of a pusher unit 540, which can be used to control or otherwise track a location of one or more vehicles (tray stacks) in robotic stack mover system. In some embodiments, sensor 518 detects an identifier associated with pusher unit 540 such as a bar code, a QR code, or other identifier disposed (e.g., printed, engraved, etc.) on a surface of pusher unit 540 or via reading a near field communication or radio-frequency identification tag associated with pusher unit 540. In various embodiments, each pusher unit has a unique identifier within a particular robotic stack mover system. The system may use the information pertaining to the pusher unit (e.g., the identifier of the pusher unit, a location of the pusher unit, etc.) in connection with controlling movement of the drive chain and/or a vehicle being moved by robotic stack mover system. For example, the system may store an association between a vehicle and a relative location or relative pusher unit. The system can store a mapping of manifests to vehicle or a mapping of manifests to a relative location of a vehicle (e.g., a location relative to pusher units serving as a boundary of a space in which the vehicle is inserted, or relative to the driving unit).

If the system has knowledge of when (or a state of one or more pusher units relative to the driving unit) a vehicle is inserted into the robotic stack mover system, the system can determine a relative location of the vehicle based on detection of pusher units. For example, if the pusher units are spaced 1 m apart, and a vehicle is inserted when a first pusher unit is detected at a particular location corresponding to sensor 518, if the system determines that two subsequent pusher units (e.g., a second pusher unit and a third pusher unit) have been detected by sensor 518, then the system determines that the vehicle has travelled 2 m (e.g., that the vehicle is 2 m from the zone at which the vehicles are inserted to robotic stack mover system. As another example, referring to FIG. 2A, if a system has a set of predefined zones at which vehicles can be moved to such as corresponding to a space between pusher unit 218a and pusher unit 218b (e.g., zone 1), a space where tray stack 222a is located (e.g., zone 2), a space where tray stack 222b is located (e.g., zone 3), a space where tray stack 222c is located (e.g., zone 4), and/or space corresponding to empty tray stack 222d (e.g., zone 5), the system can store a data structure comprising a mapping of vehicles or manifests to predefined zones. For example, with reference to system 200 of FIG. 2A, the system stores in the data structure that (i) no vehicle is mapped to zone 1, (ii) tray stack 222a is mapped to zone 2, (iii) tray stack 222b is mapped to zone 3, and (iv) tray stack 222c is mapped to zone 4, and (v) empty tray stack 222d is mapped to zone 5. If the robotic stack mover system drives the driving unit until sensor 518 detects a next pusher unit, the system may increment the data structure such that (i) no vehicle or newly inserted vehicle is mapped to zone 1, (ii) no vehicle is mapped to zone 2, (iii) tray stack 222a is mapped to zone 3, (iv) tray stack 222b is mapped to zone 4, and (v) tray stack 222c is mapped to zone 5. Accordingly, the system uses one or more sensors to track at least a relative location of a vehicle, and the system can track manifests to vehicles.

Figure 5E:
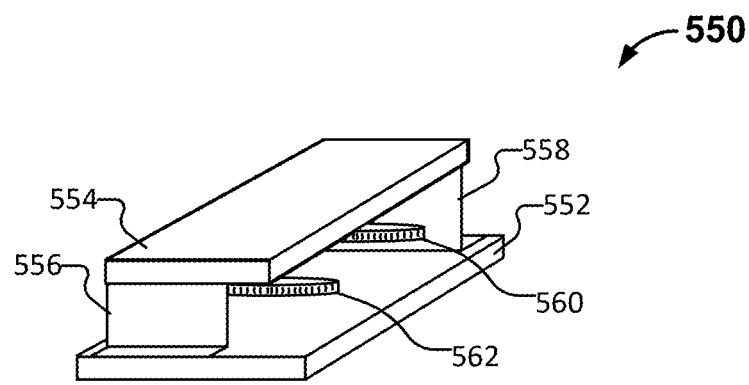
FIG. 5E is a diagram illustrating an embodiment of a tensioning unit chain of a robotic stack mover system.
Figure 5F:
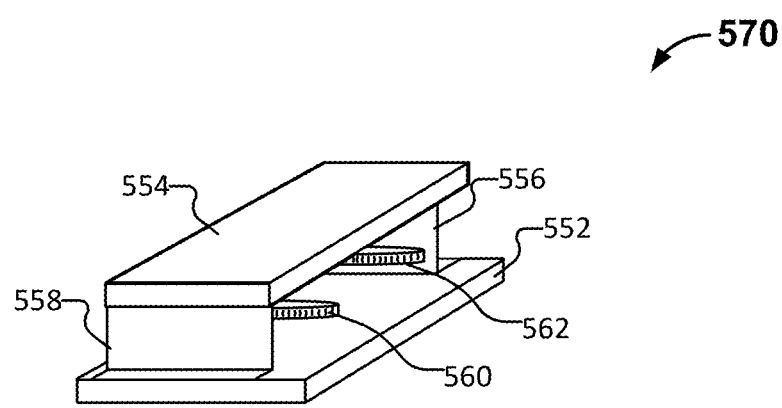
FIG. 5F is a diagram illustrating an embodiment of a tensioning unit of a robotic stack mover system.

FIG. 5E is a diagram illustrating an embodiment of a tensioning unit chain of a robotic stack mover system. FIG. 5F is a diagram illustrating an embodiment of a tensioning unit of a robotic stack mover system. As illustrated in FIGS. 5E and 5F, tensioning unit 550 and tensioning unit 570 may have different configurations, such as based on an end of the robotic stack mover system at which the corresponding tensioning unit is to be deployed. As an example, tensioning unit 550 may correspond to a right-end tensioning unit, and tensioning unit 570 may correspond to a left-end tensioning unit.

According to various embodiments, the tensioning unit is designed to be extensible for deployment in different configurations. Tensioning units for different configurations may comprise the same set of components, and an arrangement of the set of components may be modified based on an orientation of the tensioning unit relative to the robotic stack mover system. For example, tensioning unit 550 and tensioning unit 570 respectively comprise a set of one or more sprockets (e.g., tensioning sprocket 560, tensioning sprocket 562, etc.), a bottom support 552 (e.g., a bottom plate), a top support 554 (e.g., a top plate), a first side support 556 (e.g., a first side plate), and a second side support 558 (e.g., a second side plate). The support structure of the tensioning unit (e.g., bottom support 552, top support 554, first side support 556, and second side support 558) may be made of a metal such as aluminum, steel, or other metallic alloy, or other material that is sufficiently strong to support the driving unit and protect components operating within the driving unit.

The design of the tensioning unit to use a same set of components for different configurations of the tensioning unit promotes a more efficient manufacturability of tensioning units. For example, a greater level of economic efficiencies may be attained in the manufacture of such driving units. According to various embodiments, a subset of components of the driving unit and a subset of components of the tensioning unit are interchangeable. In some embodiments, only 4 different parts are used to construct a support structure (e.g., a housing) of the driving unit and the tensioning unit. For example, the robotic stack mover system can comprise a driving unit and a tensioning unit which respectively comprise a same dimension/construction for one or more of a bottom support (e.g., bottom support 510 of driving unit 530 is the same as bottom support 552 of tensioning unit 570), a top support, a first side support, and/or a second side support. As another example, one or more sprockets used in a driving unit are the same as one or more sprockets used in the tensioning unit.

Figure 6A:
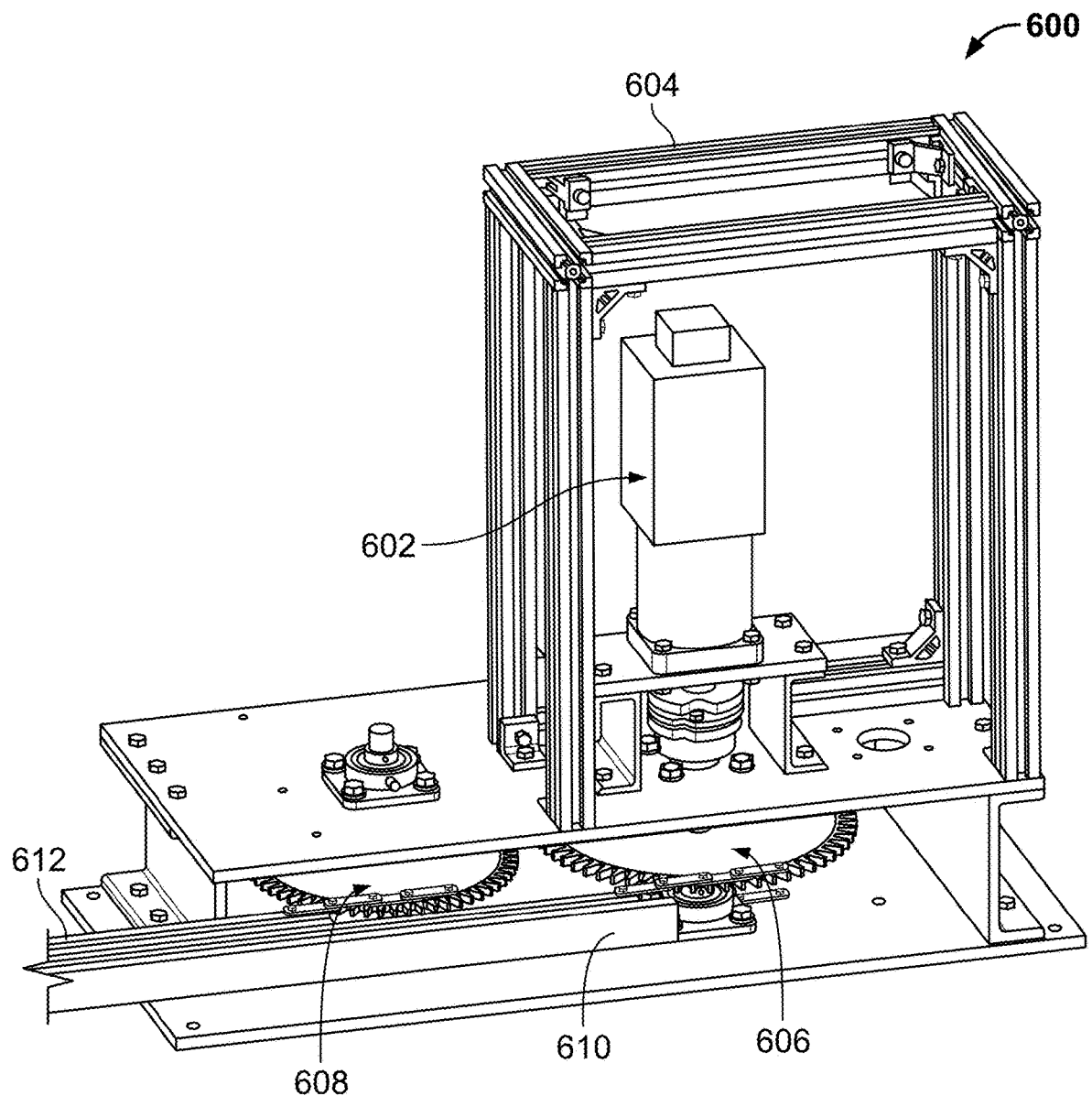
FIG. 6A is a diagram illustrating an embodiment of a driving end of a robotic stack mover system.

FIG. 6A is a diagram illustrating an embodiment of a driving end of a robotic stack mover system. In some embodiments, driving unit 600 is implemented in connection with driving unit 212 and/or driving unit 232 of system 200 of FIG. 2A, etc. As illustrated in FIG. 6A, driving unit 600 comprises a motor assembly 602 (e.g., a motor and gear box), a motor support structure 604, driving sprocket 606, idler sprocket 608, and a guide rail. In some embodiments, the guide rail comprises an ingress guide rail 610 and an egress guide rail 612. Ingress guide rail 610 directs, and provides support for, a drive chain as the drive chain enters the driving unit 600 (e.g., to promote engagement between driving sprocket 606 and the drive chain as the drive chain leaves the ingress guide rail 610). Egress guide rail 612 directs, and provides support for, the drive chain as the drive chain exits driving unit 600 and travels towards a tensioning unit of the robotic stack mover system.

Figure 6B:
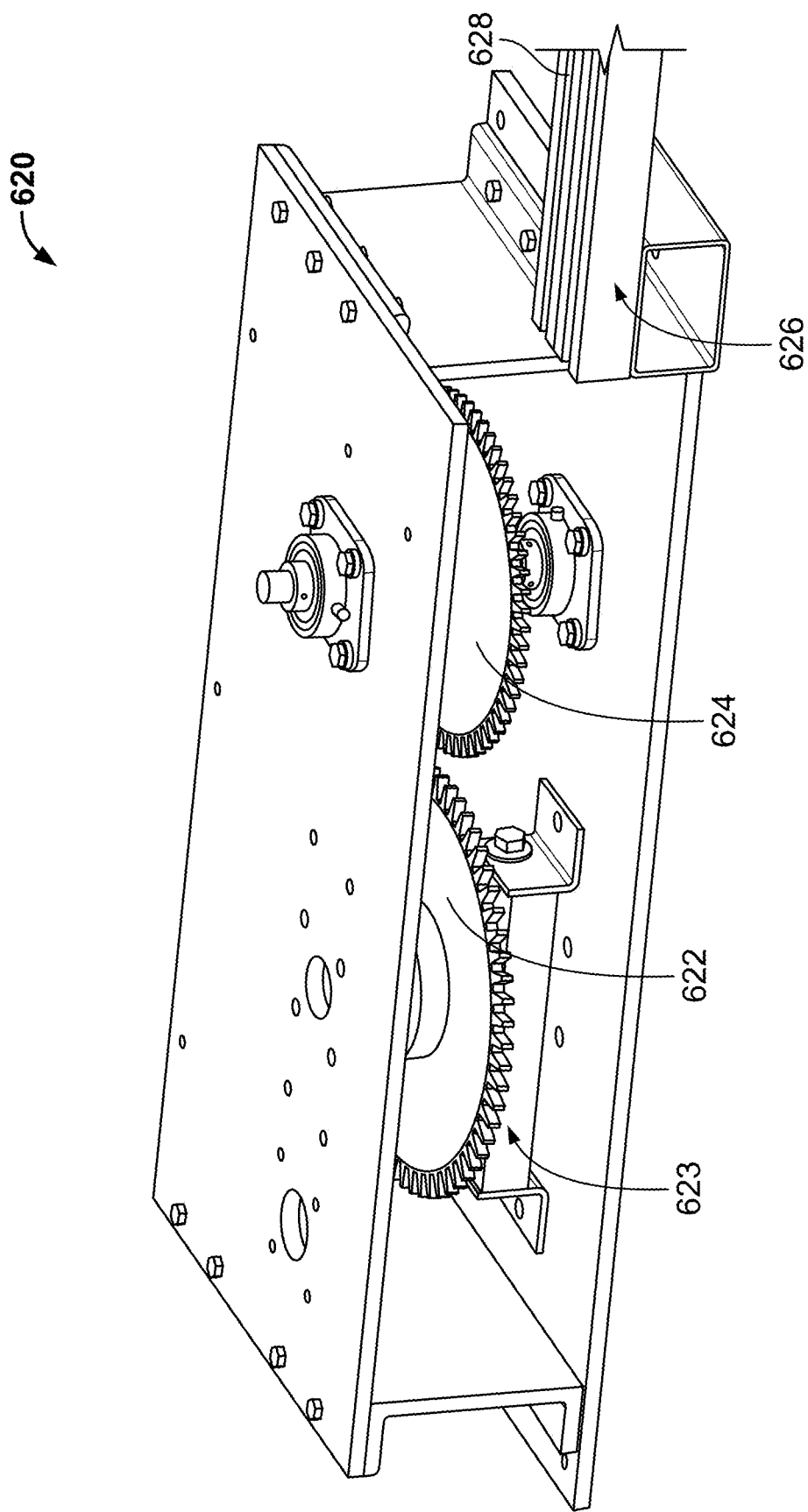
FIG. 6B is a diagram illustrating an embodiment of a tensioning end of a robotic stack mover system.

FIG. 6B is a diagram illustrating an embodiment of a tensioning end of a robotic stack mover system. In some embodiments, tensioning unit 620 is implemented in connection with tensioning unit 214 and/or tensioning unit 234 of system 200 of FIG. 2A, etc. As illustrated in FIG. 6A, tensioning unit 620 comprises tensioning sprocket 622, tensioning sprocket 624 (e.g., an idler sprocket), and a guide rail. In some embodiments, the guide rail comprises an ingress guide rail 626 and an egress guide rail 628. Ingress guide rail 626 directs, and provides support for, a drive chain as the drive chain enters the tensioning unit 620 (e.g., to promote engagement between driving sprocket 606 and the drive chain as the drive chain leaves the ingress guide rail 610. Egress guide rail 628 directs, and provides support for, the drive chain as the drive chain exits tensioning unit 620 and travels towards a driving unit of the robotic stack mover system (e.g., driving unit 600 of FIG. 6A).

According to various embodiments, one or more tensioning sprockets comprised in the tensioning unit are movably mounted. For example, as illustrated in FIG. 6B, tensioning sprocket 622 is mounted to bottom support via mounting bracket 623. Mounting bracket 623 is configured to enable tensioning sprocket 622, to move such as in order to change a tension in the drive chain. The system may control the tension of the drive chain based on a position of tensioning sprocket 622. For example, a human operator may change a position of tensioning sprocket 622. As another example, a motor may be connected to mounting bracket 623 or tensioning sprocket 622, and the tension of the drive chain may be controlled by actuating the motor to change a position of mounting bracket 623 or tensioning sprocket 622.

Figure 6C:
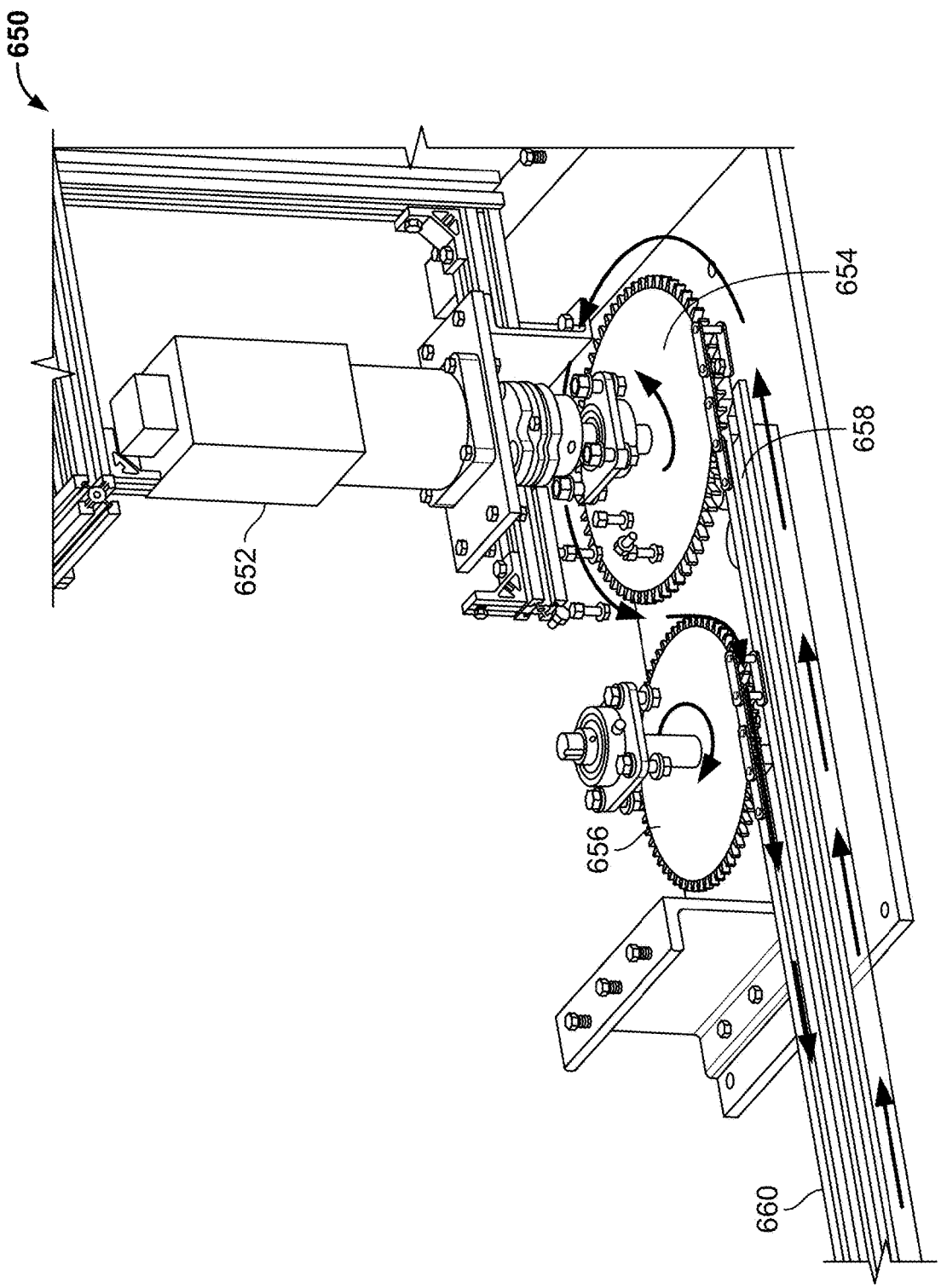
FIG. 6C is a diagram illustrating an embodiment of a driving chain traversing the driving end of a robotic stack mover system.
Figure 6D:
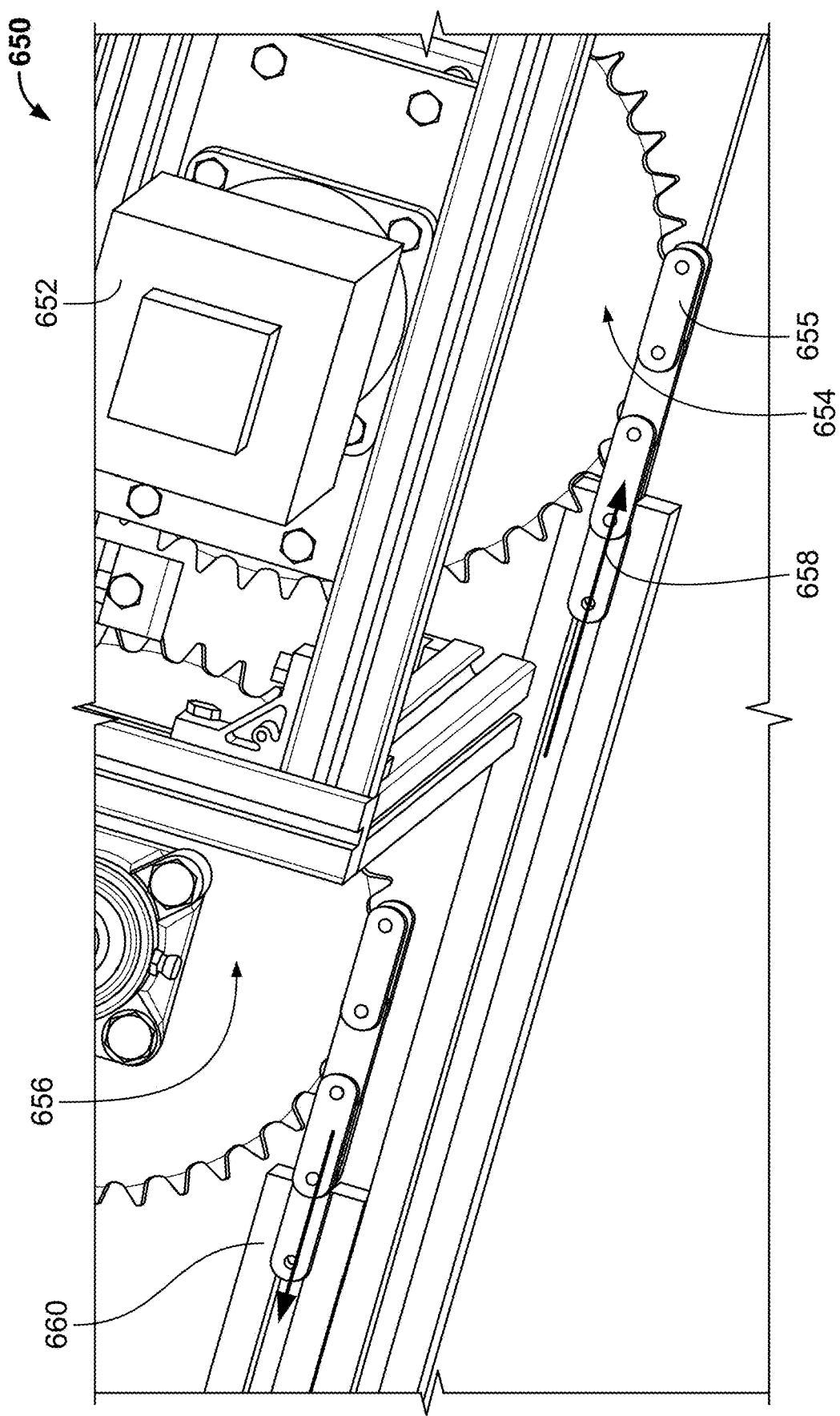
FIG. 6D is a diagram illustrating an embodiment of a driving chain traversing the driving end of a robotic stack mover system.

FIG. 6C is a diagram illustrating an embodiment of a driving chain traversing the driving end of a robotic stack mover system. FIG. 6D is a diagram illustrating an embodiment of a driving chain traversing the driving end of a robotic stack mover system. As illustrated in FIGS. 6C and 6D, driving unit 650 comprises motor 652 and driving sprocket 654. In the example illustrated in FIGS. 6C and 6D, motor 652 is driven thereby causing driving sprocket 654. As driving sprocket 654 is rotated, driving sprocket 654 causes drive chain 655, which is engaged with at least part of driving sprocket 654 to move. For example, rotation of driving sprocket 654 causes drive chain 655 to exit the ingress guide rail 658 in proximity to driving sprocket 654, and drive chain 655 travels around the outer circumference of driving sprocket 654 until drive chain 655 engages idler sprocket 656, which serves to support drive chain 655 and to guide drive chain 655 to enter the egress guide rail 660 towards the corresponding tensioning unit of the robotic stack mover system.

Figure 7A:
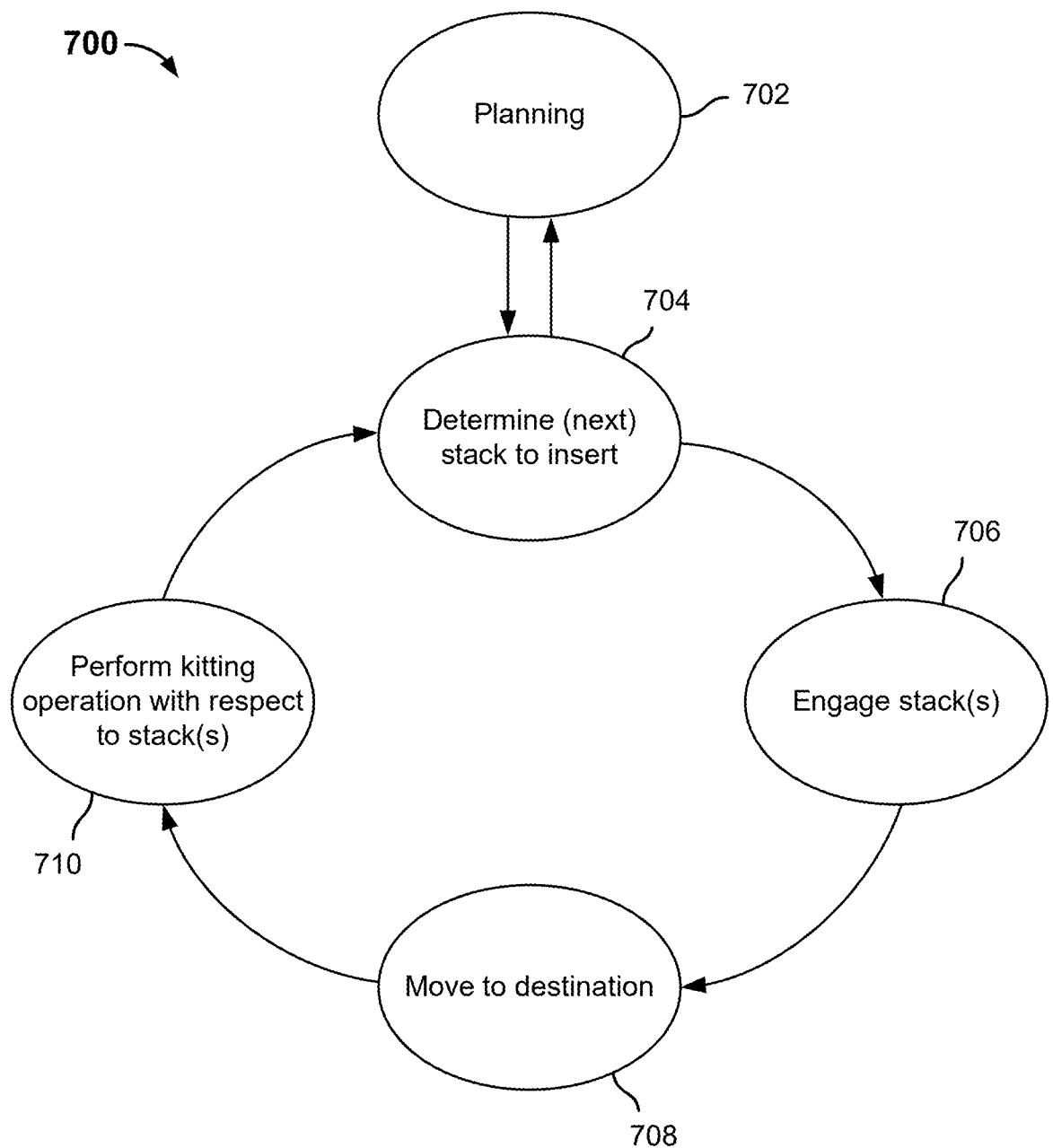
FIG. 7A is a state diagram illustrating an embodiment of an automated process to move stacks of trays.

FIG. 7A is a state diagram illustrating an embodiment of an automated process to move stacks of trays. In various embodiments, processing according to the state diagram 700 is performed by a control computer, such as control computer 248 of FIG. 2A. In the example shown, a planning state, process, and/or module 702 generates and dynamically updates a plan to insert a vehicle (e.g., a tray stack) to a robotic stack mover system such as by using robotic instrumentalities as disclosed herein to move vehicles (e.g., source tray stacks, destination tray stacks, etc.) according to a set of orders, invoices, manifests, etc. The planning state, process, and/or module 702 receives feedback indicating which destination tray stacks have been completed, which stacks of source trays have been moved into the workspace, and/or other state and context information which can be used to continuous update the plan to move the tray stacks, or to cause the tray stacks to be returned to a designated return area, or to insert a new tray stack to the robotic stack mover system. In state 704, a process controlling a given robotic instrumentality (e.g., robotic stack mover system 210, in the example shown in FIG. 2A) determines a next set of one or more vehicles to be moved from a tray stack source to a particular location along the path along the guide rail of the robotic stack mover system according to a current overall plan as received from planning state, process, and/or module 702. For example, the robot (or the system such as control computer 248) may insert a new tray stack to the system, or to advance a tray stack already within the system (e.g., to move the tray stack further along the path defined by the robotic stack mover system, etc.). The system enters state 706, in which a strategy and plan that may be determined to engage a tray stack, to insert a tray stack, and/or to move a tray stack within the workspace, and/or begin to move them toward the destination location is formed. The system enters state 708 at which the system controls the robotic stack mover system to move the tray stack(s). Once the tray stack(s) have been inserted/moved to a determined destination location has/have been grasped, the system enters state 710 in which the system controls a robot arm(s) to perform a kitting operation with respect to the tray stack (e.g., to de-stack the trays, or to stack trays on the vehicles, etc.). The system, such as control computer 248, controls a robot arm(s) to move a tray along a planned (and, if needed, dynamically adapted) trajectory to the vicinity of the destination stack, e.g., a position hovering over the destination stack and/or a location or structure on which tray is to be placed. Once the kitting operation is determined to have been securely performed, the system determines that the tray stack is complete (e.g., the stack has been completed, or the de-stacking of the stack of trays has been completed), and reenters the state, process, and/or module 702, in which a next set of one or more vehicles (e.g., tray stacks) is determined to be picked from a corresponding source and moved to a corresponding destination location (e.g., along the path of the workspace of robotic stack mover system), e.g., according to overall plan information received from planning state, process, and/or module 702. In various embodiments, a robotic system as disclosed herein continues to cycle through the states, processes, and/or modules 702, 704, 706, 708, and 710 of FIG. 7B until all destination stacks have been assembled.

Figure 7B:
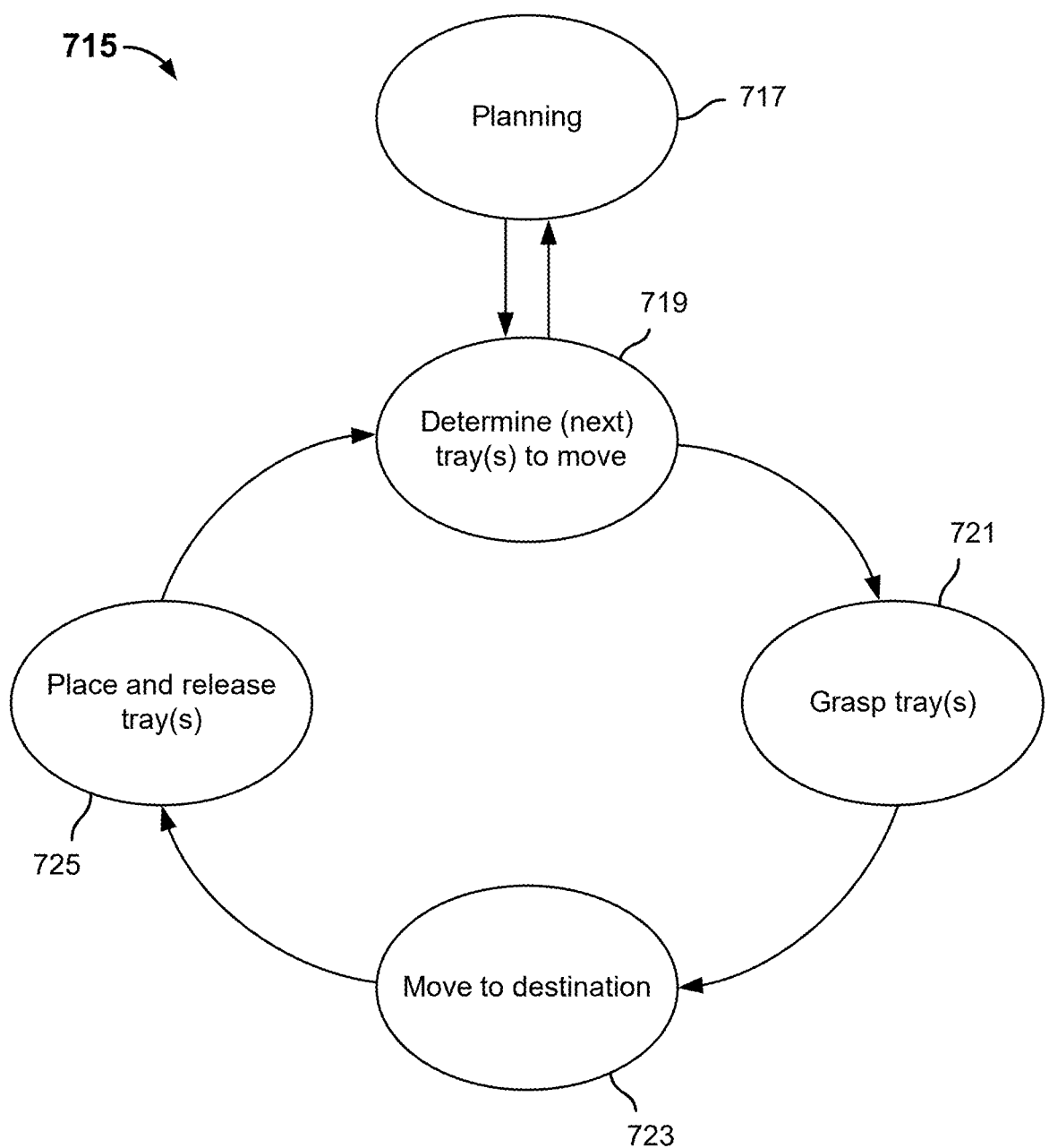
FIG. 7B is a state diagram illustrating an embodiment of an automated process to assemble stacks of trays.

FIG. 7B is a state diagram illustrating an embodiment of an automated process to assemble stacks of trays. In various embodiments, processing according to the state diagram 715 is performed by a control computer, such as control computer 248 of FIG. 2A. In the example shown, a planning state, process, and/or module 717 generates and dynamically updates a plan to assemble output stacks of trays by using robotic instrumentalities as disclosed herein to pick trays from homogeneous or non-homogeneous source stacks of trays and building destination stacks each having one or more types of trays, e.g., according to a set of orders, invoices, manifests, etc. The planning state, process, and/or module 717 receives feedback indicating which destination tray stacks have been completed, which stacks of source trays have been moved into the workspace, and/or other state and context information which can be used to continuous update the plan to pick and place (stack) trays to assemble the destination stacks. In state 719, a process controlling a given robotic instrumentality (e.g., robot arms 202 and/or 204 and associated end effectors, in the example shown in FIG. 2A) determines a next set of one or more trays to be move from a source stack to a destination stack according to a current overall plan as received from planning state, process, and/or module 717. For example, the robot (or the system such as control computer 248) may determine to grasp one, two, or more trays from a source stack to add them to (or start a new) destination stack. The robot enters state 721, in which a strategy and plan that may be determined to do one or more of move into position to grasp the tray(s), grasp the trays, and/or begin to move them toward the destination stack location is formed; and the robot moves into position and grasps the trays. Once the tray(s) has/have been grasped, the robot (or the system such as control computer 248) enters state 723 in which the tray is moved along a planned (and, if needed, dynamically adapted) trajectory to the vicinity of the destination stack, e.g., a position hovering over the destination stack and/or a location or structure on which the destination stack is to be built. In state 725, the robot place(s) the tray(s) on the destination stack. In some embodiments, the state 725 includes maneuvers under force control to verify the tray(s) is/are placed securely on the destination stack, e.g., by moving (or attempting to move) the tray(s) forward and backward (or side to side, as applicable) to ensure any interconnecting structures are aligned and well slotted, such as tabs on the bottom of the trays being placed fitting into corresponding recesses in the side walls of the tray on which the tray(s) is/are being placed. Once the trays are determined to have been placed securely, the robot releases the tray(s) and reenters the state 719, in which a next set of one or more trays is determined to be picked from a corresponding source stack and moved to a corresponding destination stack, e.g., according to overall plan information received from planning state, process, and/or module 717. In various embodiments, a robotic system as disclosed herein continues to cycle through the states 719, 721, 723, and 725 of FIG. 7B until all destination stacks have been assembled.

Figure 8A:
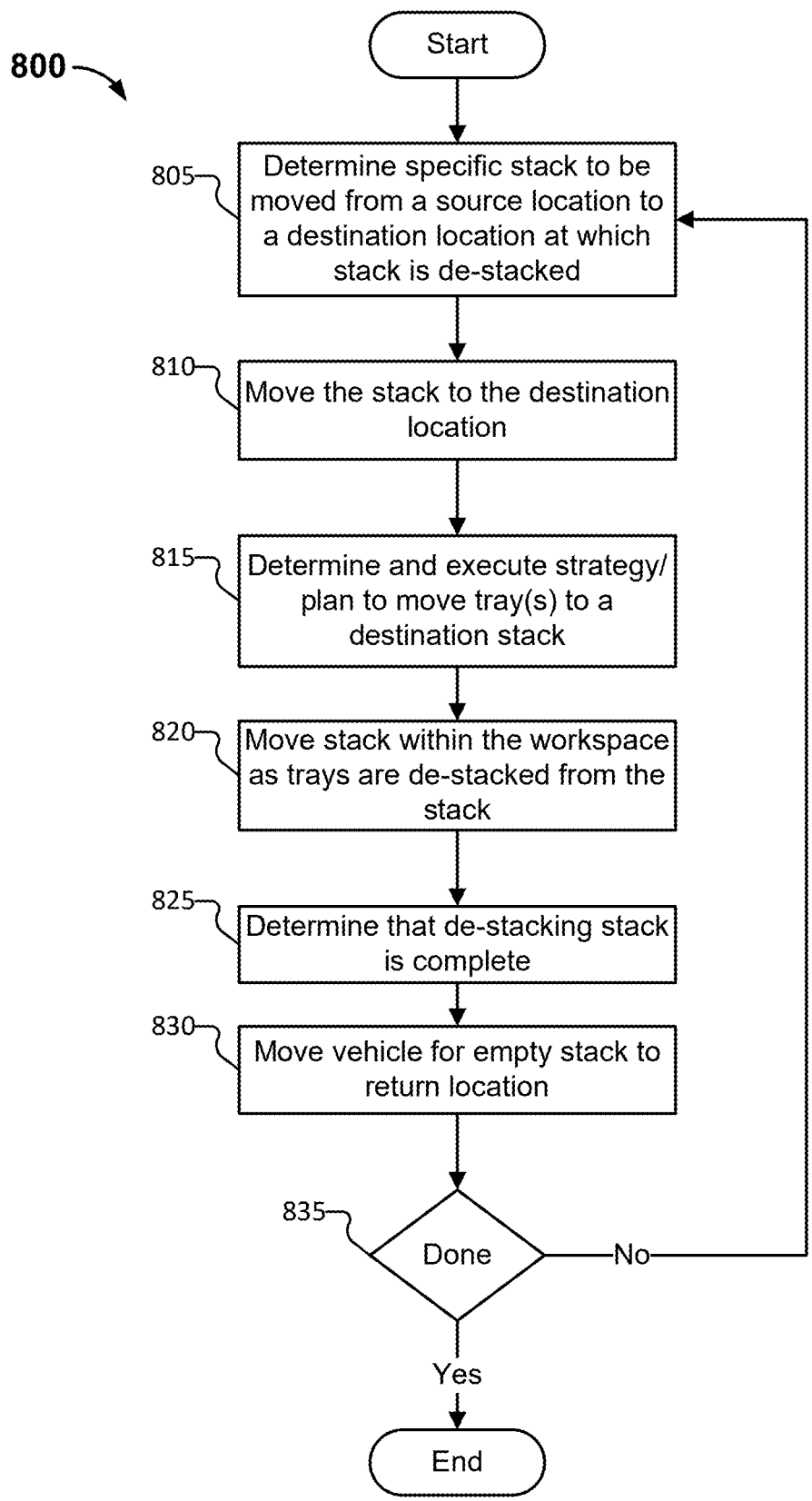
FIG. 8A is a flow diagram illustrating an embodiment of an automated process to disassemble or assemble stacks of trays.

FIG. 8A is a flow diagram illustrating an embodiment of an automated process to disassemble or assemble stacks of trays. In some embodiments, process 800 is at least partly implemented by system 200 of FIG. 2A, system 250 of FIG. 2B, and/or system 275 of FIG. 2C.

At 805, the system determines a specific stack to be moved from a source location to a destination location at which the stack is de-stacked. In some embodiments, the de-stacking the stack (e.g., stack of trays) includes controlling a robot arm to pick items (e.g., trays) from the stack and to place such items at a determined destination location (e.g., a destination location determined according to a plan for moving the items).

According to various embodiments, the system stores a data structure with which the system maintains/stores (i) a mapping of vehicles to manifests (e.g., a packing list or other information indicating a set of items or objects within items comprised in a vehicle), (ii) a mapping of vehicles to locations or relative locations of locations within the system, (iii) a mapping of vehicles to robot arms (e.g., robot arms assigned to stack/de-stack items to/from the vehicle, etc.), (iv) a mapping of robot arms to workspaces or zones corresponding to a range of the robot arms, etc. The system may monitor/track a location of a vehicle and accordingly update the data structure such as the mapping(s), etc. The system may use the data structure to track specific items (or objects comprised in a particular item/vehicle) within the system such as to track a particular vehicle to which the item is stacked, or a particular vehicle (or associated manifest) from which the item is de-stacked/taken.

In connection with determining a plan to perform a kitting operation(s) with respect to a vehicle (e.g., to de-stack a stack of trays on a tray stack), the system determines to insert the tray stack to the robotic stack mover system, and determines a location within the workspace of the system to which the tray stack is to be moved for the system to perform the kitting operation (e.g., for the tray stack to be within range of a robot arm so the system can control the robot arm to perform the kitting operations with respect to a tray stack). The system determines a particular stack for which kitting operations are to be performed. As an example, the system may select the particular stack based on the manifests for one or more available stacks. As another example, the system determines the particular stack based on a queue of stacks (e.g., the particular stack is the next stack in the queue of stacks for which kitting operations are to be performed), etc.

At 810, the stack is moved to the destination location. In some embodiments, the moving the stack to the destination location includes inserting the stack to a robotic stack mover system, such as to a predefined insertion location. The system determines a destination location to which to move the stack (e.g., to a specific area in the workspace, or a relative location such as to move the stack a predefined distance from the source location or insertion location). In response to determining the location to which to move the stack, the system controls the robotic stack mover system to move the stack to the destination location. For example, the system controls to drive the driving unit (e.g., a motor of the driving unit) to cause a drive chain to advance, which causes a pusher unit (e.g., a driving bracket) to apply a force on the stack to be moved and to push/pull the stack to the destination location.

At 820, a strategy and/or plan is determined and executed to move a tray from the source stack (e.g., the stack selected at 805) to a destination location. In some embodiments, the system determines a strategy to move to and grasp the tray(s). For example, the system plans and implements a set of maneuvers to move its end effector to a position above or otherwise near the tray(s) to be grasped. A strategy to grasp the tray(s) is determined and implemented. The system determines a plan (e.g., trajectory, etc.) to move the tray(s) to a destination stack, and the system executes the plan. The trajectory/plan takes into consideration obstacles in the workspace, such as other stacks, and potential conflicts with other robotic instrumentalities, such as another pick/place robot operating in the same workspace (e.g., robot arms 202, 204 of FIG. 2A).

At 820, the system moves the stack within the workspace as trays are de-stacked from the stack. In some embodiments, 820 is optionally performed, or the system waits until the de-stacking of the stack is complete.

According to various embodiments, the system determines to move the stack as the trays are de-stacked (e.g., before all trays have been de-stacked from the corresponding vehicle) if the system determines that the stack is to be moved to improve the ability for a robot to reach trays of the stack or to move the stack within range of a different robot. For example, with reference to FIG. 2A, tray stack 222a is within range 206 of robot arm 202. If system determines that a tray is to be de-stacked from tray stack 222a and to be placed on destination tray stack 240c, the system determines to control the robotic stack mover system to move the tray stack 222a to within range 208 of robot arm 204, which can de-stack a tray from tray stack 222a and place the tray on destination tray stack 240c (e.g., because destination tray stack 240c is within range of robot arm 204 and out of range 206 of robot arm 202).

At 825, the system determines that de-stacking trays from the stack is complete. For example, the system determines that the de-stacking is complete if the system determines that the stack is empty. In some embodiments, determining that the stack is empty comprises determining that all trays determined to be de-stacked from the stack have been successfully de-stacked. Process 800 iterates over 815 and 820 until the system determines that the de-stacking trays from the stack is complete.

At 830, the vehicle is moved to a return location. In some embodiments, in response to determining that the de-stacking of the stack is complete, the system determines to move the vehicle (e.g., the stack) to a return location. The system can move the vehicle to the return location by controlling the robotic arm to pick up the vehicle (e.g., dolly on which trays were stacked) such as using an end effector at the distal end of the robot arm, or using a structure attached to a side of the robot arm (e.g., a hook mounted to the robotic arm). In some embodiments, the system controls the robotic stack mover system to move the vehicle. For example, in response to determining that the de-stacking with respect to a vehicle is complete, the system drives the motor of the robotic stack mover system to cause the drive chain to move, which in turn engages the vehicle and causes the vehicle to move. The system controls to drive the motor to drive the drive chain sufficiently to move the vehicle from a current location to a return location such as to the end of the robotic stack mover system. The system may comprise a conveyance structure at the end of the robotic stack mover system that moves a vehicle placed thereon to a return location.

At 835, a determination is made as to whether process 800 is complete. In some embodiments, process 800 is determined to be complete in response to a determination that no further stacks are to be de-stacked, an administrator indicates that process 800 is to be paused or stopped, etc. In response to a determination that process 800 is complete, process 800 ends. In response to a determination that process 800 is not complete, process 800 returns to 805.

Figure 8B:
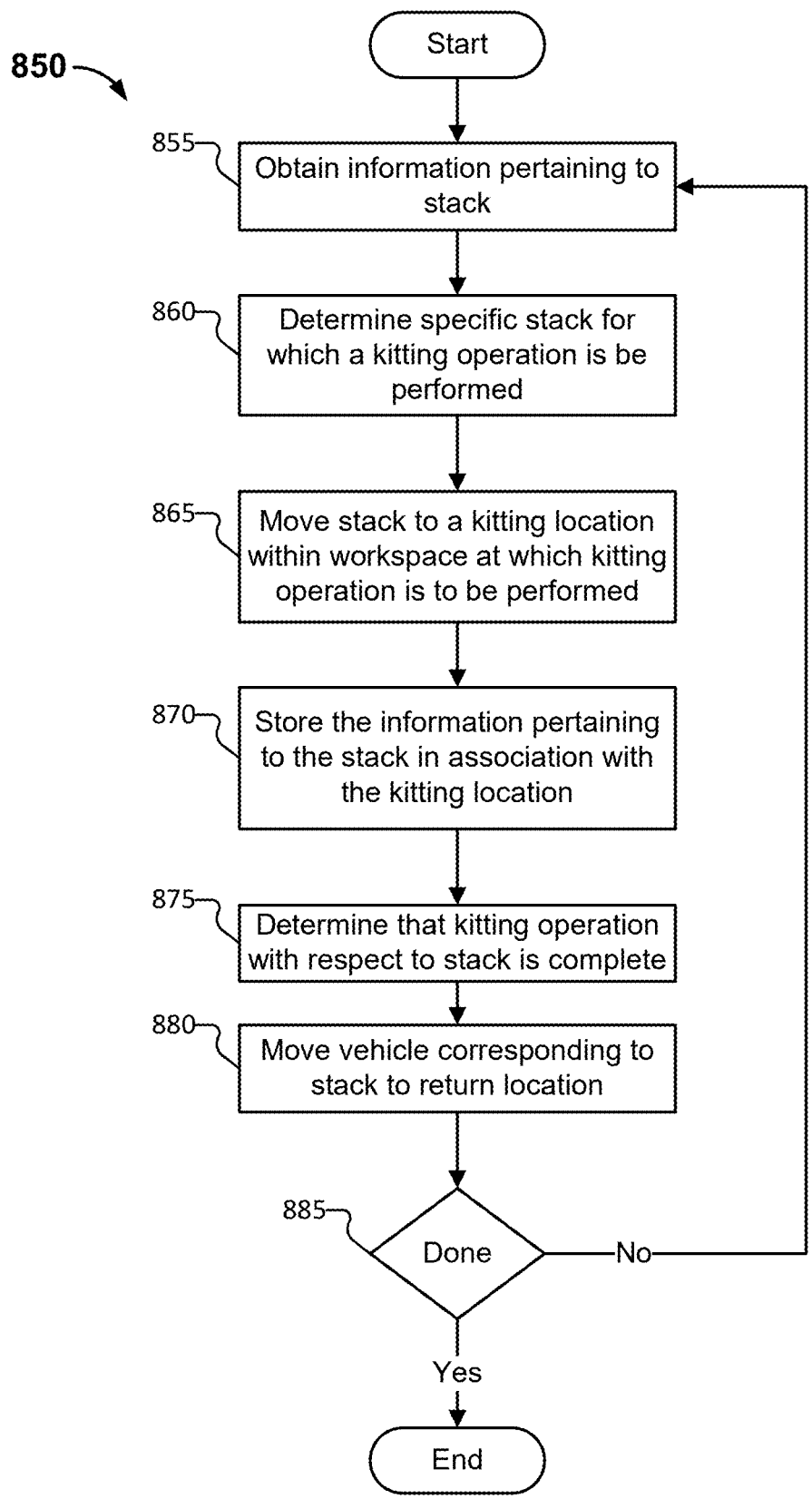
FIG. 8B is a flow diagram illustrating an embodiment of an automated process to disassemble or assemble stacks of trays.

FIG. 8B is a flow diagram illustrating an embodiment of an automated process to disassemble or assemble stacks of trays. In some embodiments, process 850 is at least partly implemented by system 200 of FIG. 2A, system 250 of FIG. 2B, and/or system 275 of FIG. 2C.

At 855, information pertaining to a stack is obtained. In some embodiments, the system determines a current location of the stack, information pertaining to a manifest associated with the stack (e.g., a set of trays comprised on the stack, a set of objects in one or more trays on the stack, a set of trays to be stacked on the stack, a set of objects to be placed on the stack, etc.).

At 860, the system determines a specific stack for which a kitting operation is to be performed. In some embodiments, the system selects a stack for which the kitting operation is to be performed. For example, the system selects a stack for which trays are to be de-stacked. As another example, the system selects a stack on which one or more trays are to be placed. The system may select the stack based on one or more of (i) a queue for insertion to the robotic stack mover system, (ii) a manifest associated with the stack, (iii) a priority of the manifest associated with the stack, (iv) a location of the stack (such as a location of the stack relative to the robotic stack mover system), etc.

At 865, the stack is moved to a kitting location within the workspace at which a kitting is to be performed. The system controls the robotic stack mover system to move the stack to the kitting location. As an example, the kitting location corresponds to a location within a range of a robot to perform the kitting operation (e.g., robot arm 202 or robot arm 204 of system 200 of FIG. 2A).

At 870, information pertaining to the stack is stored in association with the de-stacking location. In some embodiments, the system updates a mapping of stacks to locations such as a mapping of stacks to locations along the path of robotic. The system uses one or more sensors such as a vision system and/or a sensor comprised in the robotic stack mover system to determine a location of the stack.

At 875, a kitting operation performed with respect to the stack is complete. The system controls a robot (e.g., robot arm 202 or robot arm 204) to pick and place items with respect to the stack. For example, the system uses a robot to de-stack a set of one or more trays from the stack. As another example, the system uses a robot to place a tray on the stack.

At 880, the vehicle for the stack is moved to a return location. In some embodiments, in response to determining that the kitting operation(s) with respect to the stack is complete, the system determines to move the vehicle (e.g., the stack) to a return location. The system can move the vehicle to the return location by controlling the robotic arm to pick up the vehicle (e.g., dolly on which trays were stacked) such as using an end effector at the distal end of the robot arm, or using a structure attached to a side of the robot arm (e.g., a hook mounted to the robotic arm). In some embodiments, the system controls the robotic stack mover system to move the vehicle. For example, in response to determining that the de-stacking with respect to a vehicle is complete, the system drives the motor of the robotic stack mover system to cause the drive chain to move, which in turn engages the vehicle and causes the vehicle to move. The system controls to drive the motor to drive the drive chain sufficiently to move the vehicle from a current location to a return location such as to the end of the robotic stack mover system. The system may comprise a conveyance structure at the end of the robotic stack mover system that moves a vehicle placed thereon to a return location.

At 885, a determination is made as to whether process 850 is complete. In some embodiments, process 850 is determined to be complete in response to a determination that no further stacks are to be de-stacked, an administrator indicates that process 850 is to be paused or stopped, etc. In response to a determination that process 850 is complete, process 850 ends. In response to a determination that process 850 is not complete, process 850 returns to 855.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic stack mover system, comprising:
a driving unit comprising a motor;
a drive chain;
a tensioning unit that enforces tension of the drive chain; and
a guide rail traversing a distance between the driving unit and the tensioning unit; wherein:
the motor is operatively coupled to the drive chain, and the motor is configured to drive the drive chain when the motor is driven;
the guide rail comprises a channel configured to guide and support the drive chain;
the driving chain comprises a set of pusher units; and
the pusher units are respectively configured to engage one or more vehicles inserted to the system, and to cause one or more vehicles to traverse a path having a same direction as a longitudinal direction of the guide rail when the driving chain is driven in response to a control signal from a robotic control system configured to operate the robotic stack mover system under robotic control to position said one or more vehicles within reach of a robotic instrumentality to enable the robotic instrumentality to perform a task with respect to the one or more vehicles.

2. The robotic stack mover system of claim 1, wherein:
the driving unit comprises one or more driving sprockets; and
the motor is connected to at least one of the one or more driving sprockets, and the motor causes the one or more driving sprockets to rotate and drive the drive chain when the motor is driven.

3. The robotic stack mover system of claim 1, wherein:
the drive chain is a double-pitched chain comprising a set of brackets; and
a set of pusher units are mounted to at least a subset of the set of brackets.

4. The robotic stack mover system of claim 1, wherein the drive chain is a belt.

5. The robotic stack mover system of claim 1, wherein:
the set of pusher units mounted to a side of the drive chain at a proximal end of the corresponding pusher units, and
at least one pusher unit comprises at least one proximal chamfer at a proximal end of the at least one pusher unit.

6. The robotic stack mover system of claim 5, wherein the at least one proximal chamfer is configured to provide clearance for the at least one pusher unit as the at least one pusher unit recirculates between (i) a driving end comprising the driving unit and (ii) a tensioning end comprising the tensioning unit.

7. The robotic stack mover system of claim 5, wherein:
the at least one pusher unit comprises at least one distal chamfer at a distal end of the at least one pusher unit; and
the at least one distal chamfer is configured to guide at least one vehicle of the one or more vehicles to a location at which the at least one pusher unit is to engage the at least one vehicle when the motor is driven.

8. The robotic stack mover system of claim 1, wherein the tensioning unit comprises one or more tensioning sprockets.

9. The robotic stack mover system of claim 8, wherein at least one tensioning sprocket of the one or more tensioning sprockets is movably mounted in a manner that the at least one tension sprocket changes a tension of the drive chain when the at least one tensioning sprocket is moved.

10. The robotic stack mover system of claim 1, wherein the driving unit comprises at least one sensor that obtains information pertaining to an alignment of the drive chain.

11. The robotic stack mover system of claim 10, wherein:
the at least one sensor detects a location or presence of at least one of the set of pusher units.

12. The robotic stack mover system of claim 1, further comprising:
a control computer configured to drive the motor to cause the one or more vehicles to traverse the longitudinal direction of the guide rail.

13. The robotic stack mover system of claim 12, wherein the control computer is configured to drive the motor in connection with a plan to assemble/disassemble a stack of items to/from at least one vehicle of the one or more vehicles.

14. The robotic stack mover system of claim 1, wherein:
the driving unit and the tensioning unit respectively comprise a top plate, a bottom plate, and at least two side plates;
the top plate of the tensioning unit has the same dimensions as the top plate of the driving unit; and
the bottom plate of the tensioning unit has the same dimensions as the bottom plate of the driving unit.

15. The robotic stack mover system of claim 14, wherein the at least two side plates of the tensioning unit has the same dimensions as the at least two side plates of the driving unit.

16. The robotic stack mover system of claim 1, wherein the pusher units are spaced along the driving chain based at least in part on a longitudinal dimension of the vehicle.

17. The robotic stack mover system of claim 1, wherein the vehicle is a dolly configured to have trays of items stacked thereon, and the dolly comprises wheels on which the dolly traverses the path.

18. The robotic stack mover system of claim 17, wherein that the robotic instrumentality is to perform with respect to the one or more vehicles comprises: picking items from the trays.

19. A method, comprising:
determining to move one or more vehicles inserted into a robotic stack mover system, including determining to move the one or more vehicles to along a path having a same direction as a longitudinal direction of a guide rail of the robotic mover system; and
controlling to drive a motor of the robotic stack mover system in connection with driving a drive chain of the robotic stack mover system to engage the one or more vehicles with at least one pusher unit of a plurality of pusher units,
wherein:
the robotic stack mover system comprises:
a driving unit comprising a motor;
a drive chain;
a tensioning unit that enforces tension of the drive chain; and
a guide rail traversing a distance between the driving unit and the tensioning unit; and
the motor is operatively coupled to the drive chain, and the motor is configured to drive the drive chain when the motor is driven;
the guide rail comprises a channel configured to guide and support the drive chain;
the driving chain comprises a set of pusher units; and
the pusher units are respectively configured to engage one or more vehicles inserted to the system, and to cause one or more vehicles to traverse a path having a same direction as a longitudinal direction of the guide rail when the driving chain is driven in response to a control signal from a robotic control system configured to operate the robotic stack mover system under robotic control to position said one or more vehicles within reach of a robotic instrumentality to enable the robotic instrumentality to perform a task with respect to the one or more vehicles.

20. A computer program product embodied in a non-transitory computer readable medium and comprising computer instructions for:

determining to move one or more vehicles inserted into a robotic stack mover system, including determining to move the one or more vehicles to along a path having a same direction as a longitudinal direction of a guide rail of the robotic mover system; and controlling to drive a motor of the robotic stack mover system in connection with driving a drive chain of the robotic stack mover system to engage the one or more vehicles with at least one pusher unit of a plurality of pusher units;

wherein:
the robotic stack mover system comprises:
a driving unit comprising a motor;
a drive chain;
a tensioning unit that enforces tension of the drive chain; and
a guide rail traversing a distance between the driving unit and the tensioning unit; and
the motor is operatively coupled to the drive chain, and the motor is configured to drive the drive chain when the motor is driven;
the guide rail comprises a channel configured to guide and support the drive chain;
the driving chain comprises a set of pusher units; and
the pusher units are respectively configured to engage one or more vehicles inserted to the system, and to cause one or more vehicles to traverse a path having a same direction as a longitudinal direction of the guide rail when the driving chain is driven in response to a control signal from a robotic control system configured to operate the robotic stack mover system under robotic control to position said one or more vehicles within reach of a robotic instrumentality to enable the robotic instrumentality to perform a task with respect to the one or more vehicles.

* * * * *